United States Patent
Yang et al.

(10) Patent No.: US 12,444,995 B2
(45) Date of Patent: Oct. 14, 2025

(54) WIRELESS CHARGING DEVICE, TO-BE-CHARGED DEVICE, AND CHARGING

(71) Applicant: GUANGDONG OPPO MOBILE TELECOMMUNICATIONS CORP., LTD., Guangdong (CN)

(72) Inventors: Jun Yang, Guangdong (CN); Shiming Wan, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 877 days.

(21) Appl. No.: 17/701,227

(22) Filed: Mar. 22, 2022

(65) Prior Publication Data
US 2022/0216738 A1 Jul. 7, 2022

Related U.S. Application Data

(63) Continuation of application No. PCT/CN2020/127553, filed on Nov. 9, 2020.

(30) Foreign Application Priority Data

Nov. 14, 2019 (CN) .......................... 201911115135.1

(51) Int. Cl.
*H02J 50/80* (2016.01)
*H02J 7/00* (2006.01)
(Continued)

(52) U.S. Cl.
CPC ............ *H02J 50/80* (2016.02); *H02J 7/0029* (2013.01); *H02J 7/0048* (2020.01);
(Continued)

(58) Field of Classification Search
CPC .......... H02J 50/80; H02J 50/402; H02J 50/12; H02J 50/40; H02J 50/70; H02J 7/0029;
(Continued)

(56) References Cited

U.S. PATENT DOCUMENTS

| 7,999,414 B2 | 8/2011 | Bruhn |
| 9,979,233 B2 | 5/2018 | Lee et al. |

(Continued)

FOREIGN PATENT DOCUMENTS

| CN | 102882287 A | 1/2013 |
| CN | 104143861 A | 11/2014 |

(Continued)

OTHER PUBLICATIONS

Chinese First Office Action with English Translation for CN Application 201911115135.1 mailed May 29, 2023. (27 pages).

(Continued)

*Primary Examiner* — David V Henze-Gongola
(74) *Attorney, Agent, or Firm* — Young Basile Hanlon & MacFarlane, P.C.

(57) ABSTRACT

A to-be-charged device includes at least two receiving branches, a charging control module, and a battery. Each receiving branch is separately connected to the charging control module and the battery. Each receiving branch is respectively coupled to a transmitting branch in a wireless charging apparatus, an electromagnetic signal transmitted by the coupled transmitting branch is received, and the received electromagnetic signal is converted into charging voltage and charging current of the battery of said device. The charging control module generates, according to at least one of the charging voltage of the battery, the charging current of the battery, the voltage of each receiving branch, and the current of each receiving branch, feedback information instructing the wireless charging apparatus to adjust the (Continued)

transmitted power of the transmitting branch, and feeds back to the wireless charging apparatus.

19 Claims, 14 Drawing Sheets

(51) Int. Cl.
- *H02J 7/02* (2016.01)
- *H02J 50/12* (2016.01)
- *H02J 50/40* (2016.01)
- *H04W 76/10* (2018.01)

(52) U.S. Cl.
CPC ............ *H02J 7/00712* (2020.01); *H02J 7/02* (2013.01); *H02J 50/12* (2016.02); *H02J 50/402* (2020.01); *H02J 2207/20* (2020.01); *H04W 76/10* (2018.02)

(58) Field of Classification Search
CPC ........ H02J 7/0048; H02J 7/00712; H02J 7/02; H02J 7/00034; H02J 7/0071
See application file for complete search history.

(56) References Cited

U.S. PATENT DOCUMENTS

| | | | | |
|---|---|---|---|---|
| 11,296,532 | B2* | 4/2022 | Jiang | ........................ H02J 7/04 |
| 2014/0266031 | A1* | 9/2014 | Sasaki | ..................... H01F 38/14 |
| | | | | 320/108 |
| 2016/0105032 | A1* | 4/2016 | Cho | ........................ H02J 50/12 |
| | | | | 307/104 |
| 2016/0268845 | A1 | 9/2016 | Wang et al. | |

FOREIGN PATENT DOCUMENTS

| | | |
|---|---|---|
| CN | 105337427 A | 2/2016 |
| CN | 105515223 A | 4/2016 |
| CN | 106972582 A | 7/2017 |
| CN | 108448692 A | 8/2018 |
| CN | 109004756 A | 12/2018 |
| CN | 109760531 A | 5/2019 |
| CN | 109888863 A | 6/2019 |
| EP | 3462564 A1 | 4/2019 |

OTHER PUBLICATIONS

Chinese Second Office Action for Chinese Application No. 201911115135.1, mailed Feb. 27, 2024, 12 pages.
Chinese Rejection decision for Chinese Application No. 201911115135. 1, mailed Apr. 30, 2024, 23 pages.
International Search Report and Written Opinion with English Translation of PCT/CN2020/127553 mailed Jan. 19, 2021 (13 pages).
Extended European Search Report for EP Application 20888146.6 mailed Oct. 10, 2022. (10 pages).

* cited by examiner

| each of the at least two receiving branches receives the electromagnetic signal transmitted by a correspondingly coupled transmitting branch in the wireless charging device, and converts the received electromagnetic signal into the charging voltage and the charging current for charging the battery of the to-be-charged device | ⟵ S201 |

| the charging control module generates feedback information based on at least one of following charging parameters and provides the feedback information to the wireless charging device. The charging parameters include: the charging voltage of the battery, the charging current of the battery, the voltage of each receiving branch and the current of each receiving branch. The feedback information is configured to instruct the wireless charging device to adjust the transmitting power of the electromagnetic signal of each transmitting branch | ⟵ S202 |

FIG. 13

WIRELESS CHARGING DEVICE, TO-BE-CHARGED DEVICE, AND CHARGING

CROSS-REFERENCE TO RELATED APPLICATION(S)

The present application is a continuation-application of International (PCT) Patent Application No. PCT/CN2020/127553, filed on Nov. 9, 2020, which claims foreign priority of Chinese Patent Application No. 201911115135.1, filed on Nov. 14, 2019, the contents of both of which are hereby incorporated by reference in their entireties.

TECHNICAL FIELD

The present disclosure relates to the field of wireless charging, and in particular to a wireless charging device, a to-be-charged device, and a charging system.

BACKGROUND

With the development of electronic technologies, wireless charging is gradually applied to terminals, such as: mobile phones, tablets, remote controlling devices and other terminals that contain batteries. Terminals may be wirelessly charged by single-circuit wireless charging devices. The single-circuit wireless charging device takes a single coil to transmit power. Since the current on the single coil is limited, a relatively large charging power cannot be achieved. Moreover, when a voltage of a rectifier bridge in the single-way wireless charging device is increased to be higher than a certain voltage value, processing and costs of an integrated circuit process may be highly controlled. Therefore, it may be significantly difficult to increase the charging power by increasing the voltage of the rectifier bridge. In summary, the charging power of the single-circuit wireless charging device in the art is limited.

SUMMARY

The present disclosure provides a to-be-charged device including following components.

At least two receiving branches, a charging control module and a battery are included.

Each receiving branch of the at least two receiving branches is connected to the charging control module and the battery.

Each receiving branch is configured to couple to one transmitting branch of a wireless charging device to receive an electromagnetic signal transmitted by the coupled transmitting branch and configured to convert the received electromagnetic signal into a charging voltage and a charging current for charging the battery of the to-be-charged device.

The charging control module is configured to generate feedback information based on at least one of following charging parameters and provide the feedback information to the wireless charging device. The charging parameters include: a charging voltage of the battery, a charging current of the battery, a voltage of each receiving branch and a current of each receiving branch. The feedback information is configured to instruct the wireless charging device to adjust a transmitting power of the electromagnetic signal of each transmitting branch.

The present disclosure provides a wireless charging device, including: a transmit control module and at least two transmitting branches. Each transmitting branch of the at least two transmitting branches is electrically connected to a power supply, each transmitting branch of the at least two transmitting branches is connected to the transmit control module, the transmit control module is electrically connected to the power supply.

The transmit control module is configured to control an input current and an input voltage provided by the power supply to the at least two transmitting branches.

Each transmitting branch is configured to generate one path of electromagnetic signal based on the input current and the input voltage and transmit the electromagnetic signal to one receiving branch of a to-be-charged device.

The transmit control module is further configured to receive feedback information sent by the to-be-charged device and adjust a transmitting power of the electromagnetic signal of each transmitting branch based on the feedback information.

The present disclosure provides a charging system, including a wireless charging device and a to-be-charged device. The wireless charging device includes a transmit control module and at least two transmitting branches, the to-be-charged device includes at least two receiving branches, a charging control module and a battery; each transmitting branch of the at least two transmitting branches is electrically connected to a power supply, each transmitting branch of the at least two transmitting branches is electrically connected to the transmit control module; the transmit control module is electrically connected to the power supply; each receiving branch of the at least two receiving branches is electrically connected to the charging control module and the battery; and each receiving branch is electrically coupled to one of the at least two transmitting branches by electromagnetic coupling.

The transmit control module is configured to control an input current and an input voltage provided by the power supply to the at least two transmitting branches.

Each transmitting branch is configured to generate one path of electromagnetic signal based on the input current and the input voltage and transmit the electromagnetic signal to one correspondingly coupled receiving branch of the at least two receiving branches.

Each receiving branch is configured to couple to receive the electromagnetic signal transmitted by the coupled transmitting branch and configured to convert the received electromagnetic signal into a charging voltage and a charging current for charging the battery of the to-be-charged device.

The charging control module is configured to generate feedback information based on at least one of following charging parameters and provide the feedback information to the wireless charging device, wherein the charging parameters include: a charging voltage of the battery, a charging current of the battery, a voltage of each receiving branch and a current of each receiving branch.

BRIEF DESCRIPTION OF DRAWINGS

FIG. 13 is a flow chart of a charging method applied to a to-be-charged device according to an embodiment of the present disclosure.

DETAILED DESCRIPTION

Figure 1:
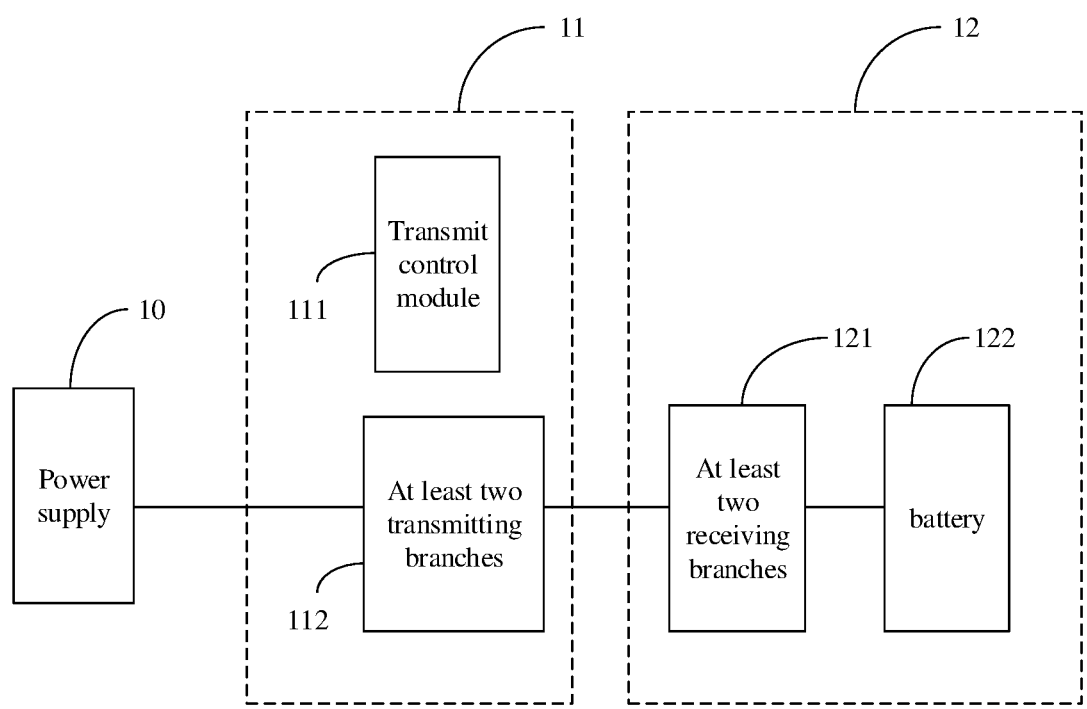
FIG. 1 is a schematic view I of a charging system according to an embodiment of the present disclosure.

Technical solutions of the embodiments of the present disclosure will be clearly and completely described in the following by referring to the accompanying drawings. In the following description, terms such as "module," "component," or "unit" are used to denote components only for the purpose of facilitating the description of the present disclosure and have no specific meaning on their own. Therefore, the term "module", "component" or "unit" may be used interchangeably.

Wireless charging originates from wireless energy transmission. According to various wireless charging principles, wireless charging methods substantially include charging by electromagnetic induction (or magnetic coupling), charging by radio waves and charging by electromagnetic resonance. At present, wireless charging protocols include the Qi protocol, the Power Matters Alliance (PMA) protocol, the Alliance for Wireless Power (A4WP) protocol, and so on. For the Qi protocol and the PMA protocol, the electromagnetic induction is applied for wireless charging. For the A4WP protocol, the electromagnetic resonance is applied for wireless charging. In the present disclosure, the wireless charging for the to-be-charged device is achieved by the electromagnetic induction. The wireless charging device (such as a wireless charging base) and the to-be-charged device transmit energy by a magnetic field. The battery in the to-be-charged device may be charged without configuring a charging cable for connecting the wireless charging device and the to-be-charged device, which allows charging to be achieved more conveniently.

It shall be understood that, the to-be-charged device may refer to a terminal. The terminal includes, but is not limited to, a mobile device such as a mobile phone, a tablet, a laptop, a PDA, a portable media player, a navigation device, and the like. The terminal device may further include a fixed terminal device such as a digital TV, a desktop computer, and the like. In addition, the to-be-charged device in the embodiments of the present disclosure may further include a mobile power source. The mobile power source may store received charging energy to provide energy to other electronic devices. Embodiments of the present disclosure do not limit the above devices.

Technical solution I in the art provides a charging system. The charging system includes a power supply, a wireless charging device and a to-be-charged device. The wireless charging device includes a transmitting coil (single transmitting coil). The to-be-charged device includes a receiving coil (single receiving coil), a rectifier bridge and a battery. The power supply is connected to a power source and provides an input current and an input voltage to the wireless charging device. The single transmitting coil in the wireless charging device generates an electromagnetic signal based on the input current and the input voltage, and transmits the electromagnetic signal to the single receiving coil. The rectifier bridge rectifies the electromagnetic signal based on the electromagnetic signal received by the single receiving coil, and outputs one path of current and one path of voltage. One path of current and one path of voltage output by the rectifier bridge may be transmitted to the battery. In this way, the battery may be charged by the one path of current and one path of voltage output from the rectifier bridge.

To be noted that, since the charging system in the technical solution I in the art takes the single-circuit wireless charging, with the increasing charging power requirement, the current on the coil cannot be large enough due to limitation of the single receiving coil. Therefore, the charging power may be increased by increasing the voltage on the rectifier bridge. However, according to requirements of the integrated circuit process in the art, when the voltage exceeds 30 volts (V), the processing and the costs of the integrated circuit will be significantly high, thus limiting the increase in the charging power.

Further, technical solution II in the art provides a charging system. The wireless charging device in the charging system includes a single transmitting coil. The to-be-charged device includes double receiving coils, a rectifier bridge and a battery. The double receiving coils are connected to the battery through the rectifier bridge. Since the double receiving coils share the rectifier bridge in common, in order to avoid the rectifier bridge from operating disorderly, the double receiving coils operate in a time-sharing manner. In this way, the charging power still cannot be increased.

An embodiment of the present disclosure provides a charging system, as shown in FIG. 1. A charging system 1 includes a power supply 10, a wireless charging device 11 and a to-be-charged device 12. The wireless charging device 11 includes a transmit control module 111 and at least two transmitting branches 112. The to-be-charged device includes at least two receiving branches 121 and a battery 122. The at least two transmitting branches 112 and the at least two receiving branches 121 are in one-to-one correspondence. Each transmitting branch of the at least two transmitting branches 112 is electrically connected to a unique corresponding receiving branch of the at least two receiving branches 121 by electromagnetic coupling. After the transmit control module 111 obtains an input current and an input voltage provided by the power supply 10, the transmit control module 111 transmits the input current and the input voltage to the at least two transmitting branches 112. The at least two transmitting branches 112 generate at least two circuits of electromagnetic signals based on the input current and the input voltage. Each transmit branch transmits one path of electromagnetic signal to the corresponding receiving branch. Each of the at least two receiving branches 121 generates one path of current and one path of voltage based on the received one path of electromagnetic signal, and transmits one path of current and one path of voltage to the battery 122, such that the battery 122 may be charged through at least two circuits of electromagnetic signals at the same time. In this way, a plurality of charging paths are formed by the at least two transmitting branches 112 and the at least two receiving branches 121. The plurality of charging paths may simultaneously charge the battery 122, doubling the charging power and significantly improving the charging power. In addition, due to the plurality of charging paths, a charging power on each of the plurality of charging paths can be reduced, which a heated region may be scattered, charging heat may be reduced, thus further improving a charging efficiency.

To be noted that, a structure of the charging system illustrated in FIG. 1 does not limit the charging system. The charging system may include more or fewer components than illustrated in the figure, or a combination of certain components, or a different arrangement of the components. Embodiments of the present disclosure may be implemented based on the charging system illustrated in FIG. 1, and specific embodiments are described below based on the system illustrated in FIG. 1.

Figure 2:
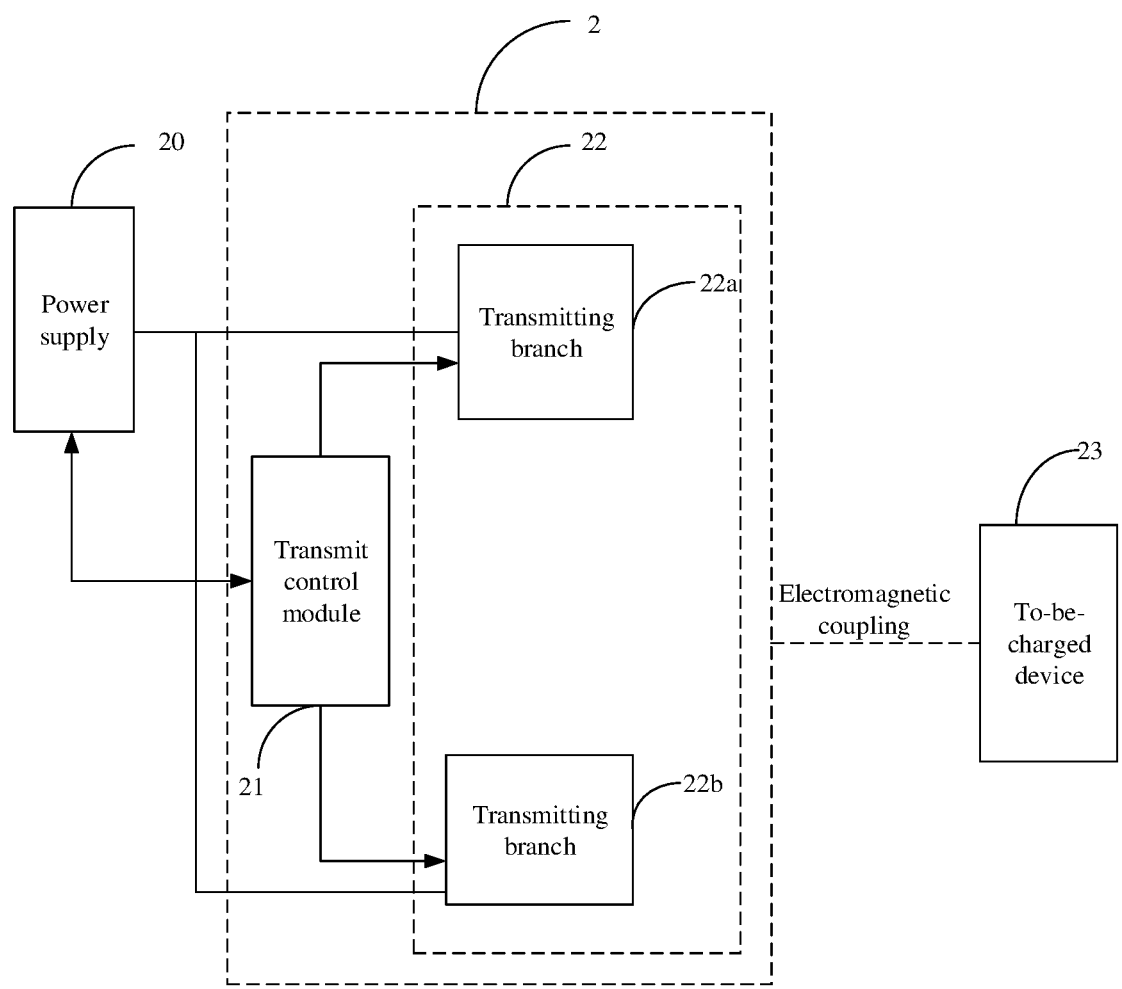
FIG. 2 is a structural schematic view I of a wireless charging device according to an embodiment of the present disclosure.

Embodiments of the present disclosure provide a wireless charging device, as shown in FIG. 2. The wireless charging device 2 includes: a transmit control module 21 and at least two transmitting branches 22 (such as including a transmitting branch 22a, a transmitting branch 22b, and so on). Each transmitting branch of the at least two transmitting branches 22 is electrically connected to the power supply 20. Each transmitting branch of the at least two transmitting branches 22 is electrically connected to the transmit control module 21. The transmit control module 21 is electrically connected to the power supply 20. The transmit control module 21 is configured to control an input current and an input voltage provided by the power supply 20 to the at least two transmitting branches 22. Each transmitting branch is used to generate one path of electromagnetic signal based on the input current and the input voltage, and configured to transmit the one path of electromagnetic signal to one receiving branch of the to-be-charged device 23. The transmit control module 21 is further configured to receive feedback information from the to-be-charged device 23 and adjust a transmitting power of the electromagnetic signal of each transmitting branch based on the feedback information.

The wireless charging device 2 is externally connected to the power supply 20. The wireless charging device 2 is electrically connected to the to-be-charged device 23 by means of electromagnetic coupling. When the wireless charging device 2 is connected to a power source through the power supply 20, the wireless charging device 2 starts charging the to-be-charged device 23 and receives the feedback information sent by the to-be-charged device 23 for adjusting the transmitting power of the electromagnetic signal of each transmitting branch.

In some embodiments, a same wireless charging protocol may be supported by both the wireless charging device and the to-be-charged device. The wireless charging protocol includes a standard wireless charging protocol and a non-standard wireless charging protocol. The standard wireless charging protocol includes the Qi protocol and the like. The non-standard wireless charging protocol includes the PMA protocol, the A4WP protocol, and the like. In some embodiments, the wireless charging device is in handshake communication with the to-be-charged device, and when the handshake communication is established, charging of the to-be-charged device may start.

In some embodiments, establishment of the handshake communication between the wireless charging device and the to-be-charged device indicates that the wireless charging device and the to-be-charged device support the same wireless charging protocol. The wireless charging device may charge the to-be-charged device according to the charging power set by the supported wireless charging protocol. In some embodiments, each of the at least two transmitting branches supports any of available wireless charging protocols. For example, at least one of the at least two transmitting branches may be set to support the standard wireless charging protocol, and the transmitting branch of the at least two transmitting branches other than the at least one transmitting branch mentioned above supports the non-standard wireless charging protocol. Alternatively, all of the transmitting branches may support the standard wireless charging protocol.

In some embodiments, the at least two transmitting branches may support the same wireless charging protocol or different wireless charging protocols. Each of the at least two transmitting branches and the corresponding receiving branch in the to-be-charged device support the same wireless charging protocol. Exemplarily, one of the at least two transmitting branches supports the standard wireless charging protocol (such as the Qi protocol), and the remaining transmitting branch of the at least two transmitting branches other than the above transmitting branch supports the non-standard wireless charging protocol. In this way, the power of the remaining transmitting branch is not limited by the power set by the standard wireless charging protocol, and the device may be charged with a larger charging power, improving charging efficiency.

To be noted that, each of the at least two transmitting branches and the corresponding receiving branch in the to-be-charged device support the same wireless charging protocol. Exemplarily, the at least two transmitting branches include a transmitting branch t1 supporting the standard wireless charging protocol, a transmitting branch t2 supporting the non-standard wireless charging protocol. In the to-be-charged device, a receiving branch r1 is correspondingly coupled to the transmitting branch t1 and also supports the standard wireless charging protocol; and a receiving branch r2 is correspondingly coupled to the transmitting branch t2 and also supports the non-standard wireless charging protocol.

In some embodiments, the transmit control module is further configured to receive charging parameters of the to-be-charged device and adjust the transmitting power of the electromagnetic signal of each transmitting branch according to the charging parameters.

The transmit control module obtains the charging parameters from the feedback information sent by the to-be-charged device, and compares the charging parameters to preset charging parameter thresholds to determine whether to adjust the transmitting power of the electromagnetic signal of each transmitting branch.

In some embodiments, the charging parameters include at least one of: a charging voltage of the battery, a charging current of the battery, a voltage of each receiving branch, and a current of each receiving branch. In some embodiments, the voltage of each receiving branch includes an output voltage of the AC to DC conversion module in each receiving branch, and the current of each receiving branch includes an output current of the AC to DC conversion module in each receiving branch. The output voltage of the AC to DC conversion module in each receiving branch may be a voltage at any point on the charging path in the same receiving branch, as long as the voltage is able to reflect the voltage of the receiving coil in the same receiving branch. Similarly, the output current of the AC to DC conversion module in each receiving branch may be a current at any point on the charging path in the same receiving branch, as long as the current is able to reflect the current of the receiving coil in the same receiving branch. In some embodiments, the preset charging parameter thresholds include a charging power threshold, a current threshold, and a voltage threshold. The charging power threshold may be a total charging power threshold corresponding to the battery. The current threshold may be a total current threshold or a current threshold corresponding to each of the at least two receiving branches. The voltage threshold may be a total voltage threshold or a voltage threshold corresponding to each of the at least two receiving branches.

In some embodiments, the current threshold corresponding to each receiving branch may be a maximum current threshold of the receiving coil set by the wireless charging protocol supported by the receiving branch. The voltage threshold corresponding to each receiving branch may be a maximum voltage threshold of the receiving coil set by the wireless charging protocol supported by the receiving branch.

The current threshold corresponding to each receiving branch in the preset charging parameter threshold may be the threshold set by the standard wireless charging protocol. Alternatively, current thresholds corresponding to a portion of all receiving branches in the preset charging parameter thresholds are thresholds set the standard wireless charging protocol, and current thresholds corresponding to another portion of the receiving branches in the preset charging parameter thresholds are charging parameter thresholds set by the non-standard wireless charging protocol.

To be noted that, whether the current threshold corresponding to each receiving branch in the preset charging parameter threshold is the threshold set by the standard wireless charging protocol depends on whether the receiving branch itself supports the standard wireless charging protocol. Exemplarily, the preset charging parameter thresholds include a current threshold c1 corresponding to the receiving branch r1 in the to-be-charged device, and a current threshold c2 corresponding to the receiving branch r2 in the to-be-charged device. When the receiving branch r1 supports the standard wireless charging protocol, the current threshold c1 is the current threshold set by the standard wireless charging protocol. When the receiving branch r2 supports the non-standard wireless charging protocol, the current threshold c2 is the current threshold set by the non-standard wireless charging protocol.

Further, the charging power threshold includes a charging power threshold of each charging stage. The current threshold corresponding to each receiving branch includes a current threshold of each charging stage. The voltage threshold corresponding to each receiving branch includes a voltage threshold of each charging stage.

To be noted that, the charging current and the charging voltage required by the battery may vary for various charging stages. Therefore, the charging power threshold for each receiving branch may be predefined based on the charging current and/or the charging voltage required by the battery at each of the various charging stages. The charging power threshold may be a constant value or a range of values. In addition, each current threshold may also be a constant value or a range of values. Each voltage threshold may also be a constant value or a range of values. In some embodiments, the transmit control module is further configured to determine a desired charging power based on the charging voltage and/or the charging current of the battery; and to adjust a transmit power of the electromagnetic signal of each transmitting branch respectively based on the desired charging power.

The transmit control module multiplies the charging voltage and the charging current of the battery to obtain the charging power of the battery. The transmit control module obtains a preset charging power threshold from the preset charging parameter thresholds, and calculates the desired charging power based on the preset charging power threshold and the charging power of the battery. The transmit control module adjusts the transmitting power of the electromagnetic signal of each transmitting branch respectively based on the desired charging power. The transmit control module, based on the demanded charging power, may adjust transmitting powers of the electromagnetic signals of all transmitting branches or may adjust the transmitting power of the electromagnetic signal of at least one transmitting branch.

To be exemplary, the transmit control module subtracts the charging power of the battery from the preset charging power threshold to obtain the desired charging power. When the desired charging power is a positive value, the transmit control module increases transmitting powers of the electromagnetic signals of at least two transmitter branches. When the desired charging power is a negative value, the transmit control module decreases transmitting powers of the electromagnetic signals of at least two transmitter branches.

In some embodiments, the transmit control module is further configured to determine a desired current based on at least two output currents and/or at least two output voltages corresponding to at least two receiving branches, and configured to adjust the transmitting power of the electromagnetic signal of each transmitting branch respectively based on the desired current.

The transmit control module determines one desired current from all output currents and/or all output voltages corresponding to all receiving branches. The transmit control module compares the desired current to the current threshold. The desired current being greater than the current threshold may indicate that at least two receiving branches have coils that are severely heated. In this case, the transmit control module adjusts the transmitting powers of the electromagnetic signals of all transmitting branches, or the transmitting power of the electromagnetic signal of at least one transmitting branch, based on the desired current.

To be exemplary, the at least two receiving branches include a first receiving branch, a second receiving branch, . . . , a n-th receiving branch, and the n is the total number of receiving branches in the transmit control module. The transmit control module determines a first desired current based on an output current and/or an output voltage of the first receiving branch. The transmit control module determines a second desired current based on an output current and/or an output voltage of the second receiving branch. The transmit control module determines a n-th desired current based on an output current and/or an output voltage of the n-th receiving branch. The transmit control module determines the desired current based on the first desired current, the second desired current, . . . , and the n-th desired current.

Further, when desired currents of all the receiving branches are the same, i.e., when the first desired current, the second desired current, . . . , and the nth desired current are the same, any one of them may be selected as a to-be-determined desired current. When the desired currents of all the receiving branches are different from each other, i.e., when not all of the first desired current, the second desired current, . . . , and the n-th desired current are identical, the transmit control module may determine a main receiving branch from all the receiving branches and take a desired current of the main receiving branch as the to-be-determined desired current; alternatively, the transmit control module may select a maximum desired current from the first desired current, the second desired current, . . . , and the n-th desired current and take the maximum desired current as the to-be-determined desired current, and this is, a desired current on a most severely heated receiving branch is taken as the to-be-determined desired current. The present disclosure does not limit how to determine the to-be-determined desired current.

In some embodiments, the main receiving branch may be a receiving branch that supports the standard wireless charging protocol. In some embodiments, the transmit control module is further configured to: determine a desired charging power based on the charging voltage and/or the charging current of the battery; determine the desired current based on at least two output currents corresponding to at least two receiving branches; determine the desired voltage based on the desired charging power and the desired current; and adjust the transmitting power of the electromagnetic signal of each transmitting branch respectively based on the desired voltage.

The transmit control module multiplies the charging voltage and the charging current of the battery to obtain the charging power of the battery. The transmit control module obtains the charging power threshold from the preset charging parameter thresholds, and calculates the desired charging power based on the charging power threshold and the charging power of the battery. The transmit control module determines one desired current from all output currents and/or all output voltages corresponding to all receiving branches. The transmit control module compares the desired charging power to the charging power threshold, and compares the desired current and the current threshold. The transmit control module determines the desired voltage in a case that the desired charging power does not exceed the charging power threshold, and that the desired current does not exceed the current threshold. In this way, adjusting the transmitting power of the electromagnetic signal of at least one transmitting branch may be achieved by adjusting the desired voltage.

To be noted that, the transmit control module adjusts the transmitting power of the electromagnetic signal of the transmitting branch, based on the charging power threshold and the current threshold. In this way, after the transmitting power is adjusted, the charging power of the correspondingly coupled receiving branch reaches the charging power threshold, heating of the coils in the transmitting branch and heating of coils in the correspondingly coupled receiving branch is reduced.

In some embodiments, the transmit control module is further configured to compare the desired voltage to the output voltage of each receiving branch respectively to obtain a voltage difference; and to adjust the transmitting power of the electromagnetic signal of the transmitting branch coupled to each receiving branch based on the voltage difference.

After determining the desired voltage, the transmit control module compares the desired voltage to the output voltage of the AC to DC conversion module in at least one of receiving branch (such as calculating a difference value) to obtain a voltage difference value. The transmit control module adjusts the transmitting power of the electromagnetic signal of the transmitting branch coupled to at least one of receiving branch based on the voltage difference value. The desired voltage may be compared to output voltages of AC to DC conversion modules in some receiving branches to obtain voltage difference values. Alternatively, the desired voltage may be compared to output voltages of AC DC conversion modules in all receiving branches to obtain voltage difference values.

In some embodiments, the transmit control module is further configured to receive feedback information sent from the to-be-charged device about increasing a transmitting voltage or decreasing the transmitting voltage. After receiving the feedback information about increasing the transmitting voltage or decreasing the transmitting voltage, the transmit control module adjusts the transmitting voltage in at least one transmitting branch based on a certain adjustment level. A transmitting branch, which has the adjusted transmitting branch, may be a transmitting branch coupled to the receiving branch specified in the feedback information or any one of all transmitting branches. The transmit control module receives the feedback information in real time to adjust the transmitting voltage in at least one transmitting branch in real time.

Figure 3:
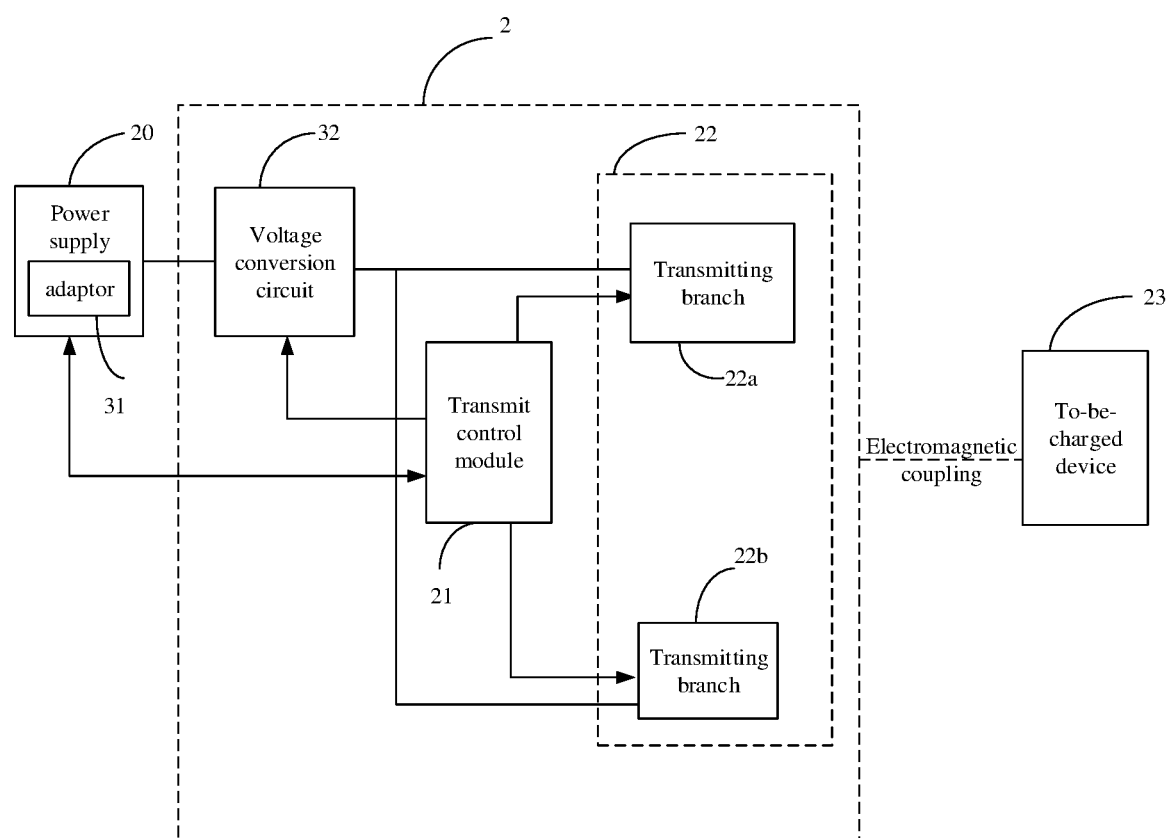
FIG. 3 is a structural schematic view II of a wireless charging device according to an embodiment of the present disclosure.

In some embodiments, as shown in FIG. 3, the wireless charging device further includes a voltage conversion circuit 32. The voltage conversion circuit (DC/DC) 32 is connected to at least two transmitting branches 22. The voltage conversion circuit 32 is configured to obtain an initial input current and an initial input voltage provided by the power supply 20. The voltage conversion circuit 32 is configured to adjust the initial input current and the initial input voltage to obtain the input current and the input voltage, and to transmit the input current and the input voltage to the at least two transmitting branches 22. The power supply 20 includes an adapter 31.

To be exemplary, the power supply that connects to the wireless charging device may take the adapter to perform DC to AC conversion on electrical energy provided by the power source to generate the initial input current and the initial input voltage. The wireless charging device further includes the voltage conversion circuit for boosting the initial input current and the initial input voltage to obtain the input current and the input voltage. The input current and the input voltage are transmitted to at least two transmitting branches that are connected in parallel.

In some embodiments, the power supply connected to the wireless charging device may perform DC to AC conversion and boosting on the electrical energy from supplied by the power source to generate the input current and an input power, and may directly transmit the input current and the input power to the at least two transmitting branches. In this case, the wireless charging device does not include the voltage conversion circuit. In some embodiments, the voltage conversion circuit includes a DC chopper (DC/DC). The DC/DC includes a Buck circuit, a Boost circuit, a Boost/Buck circuit, and a charge pump circuit.

To be exemplary, the DC/DC may be the Boost circuit; and the initial input current and the initial input voltage may be boosted by the Boost circuit.

Figure 4:
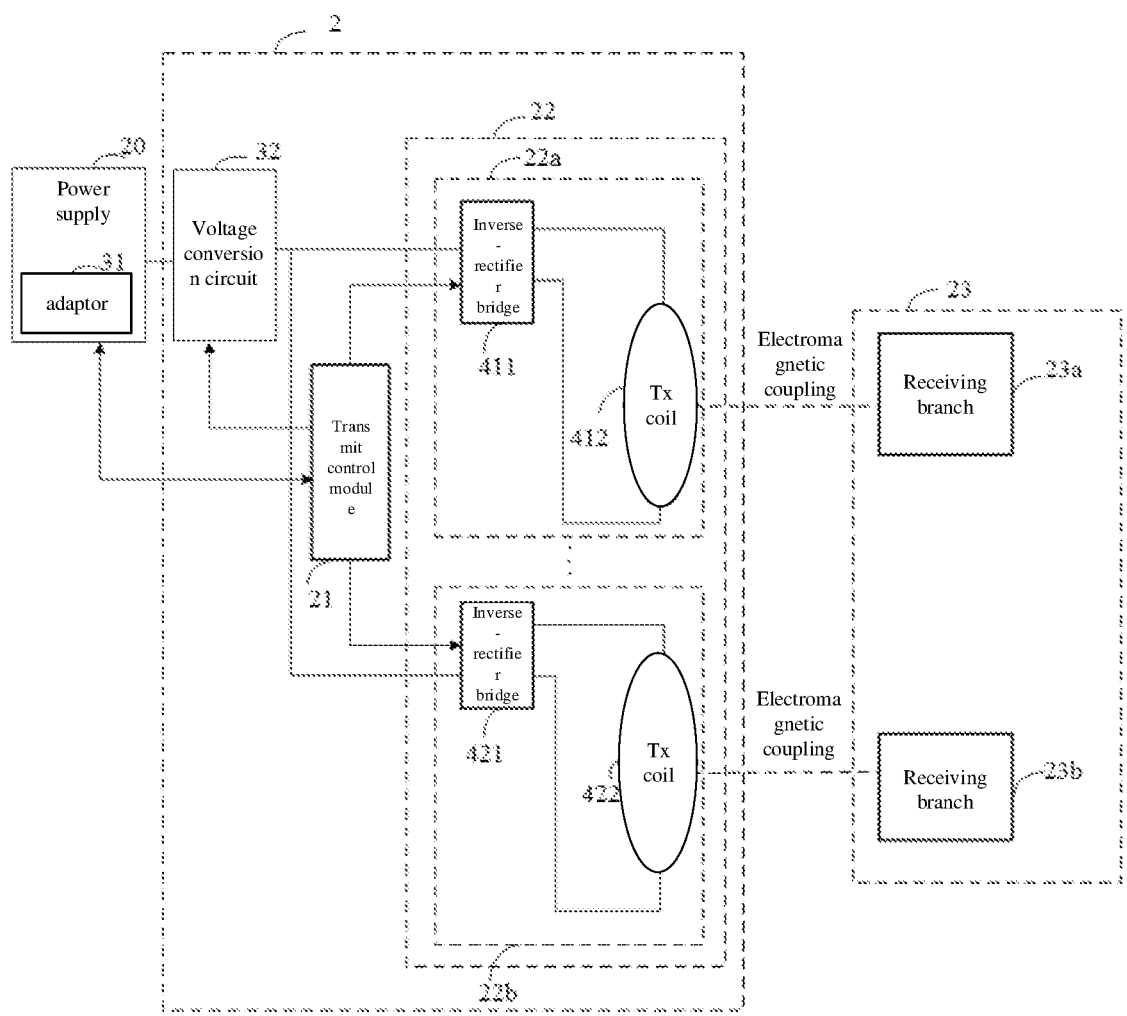
FIG. 4 is a structural schematic view III of a wireless charging device according to an embodiment of the present disclosure.

In some embodiments, as shown in FIG. 4, each of the at least two transmitting branches 22 includes an inverse-rectifier bridge (such as an inverse-rectifier bridge 411 or an inverse-rectifier bridge 421) and a transmitting coil (such as a Tx coil 412 or a Tx coil 422). Each of the transmit control module 21 and the voltage conversion circuit 32 is connected to an end of the inverse-rectifier bridge of each transmitting branch. The other end of the inverse-rectifier bridge of each transmitting branch is connected to a corresponding transmitting coil. The voltage conversion circuit 32 is further configured to transmit the input current and the input voltage to the inverse-rectifier bridge of each transmitting branch. The inverse-rectifier bridge is configured to perform voltage regulation of DC to AC conversion on the input current and the input voltage to obtain one path of transmitting current and one path of transmitting voltage, and configured to the circuit of transmitting current and the circuit of transmitting voltage to a transmitting coil of the respective transmitting branch. The transmitting coil generates one path of electromagnetic signal based on the circuit of transmitting current and the circuit of transmitting voltage, and transmits the circuit of electromagnetic signal to a correspondingly coupled receiving branch (such as a receiving branch 23a or a receiving branch 23b) in the to-be-charged device 23.

Figure 5:
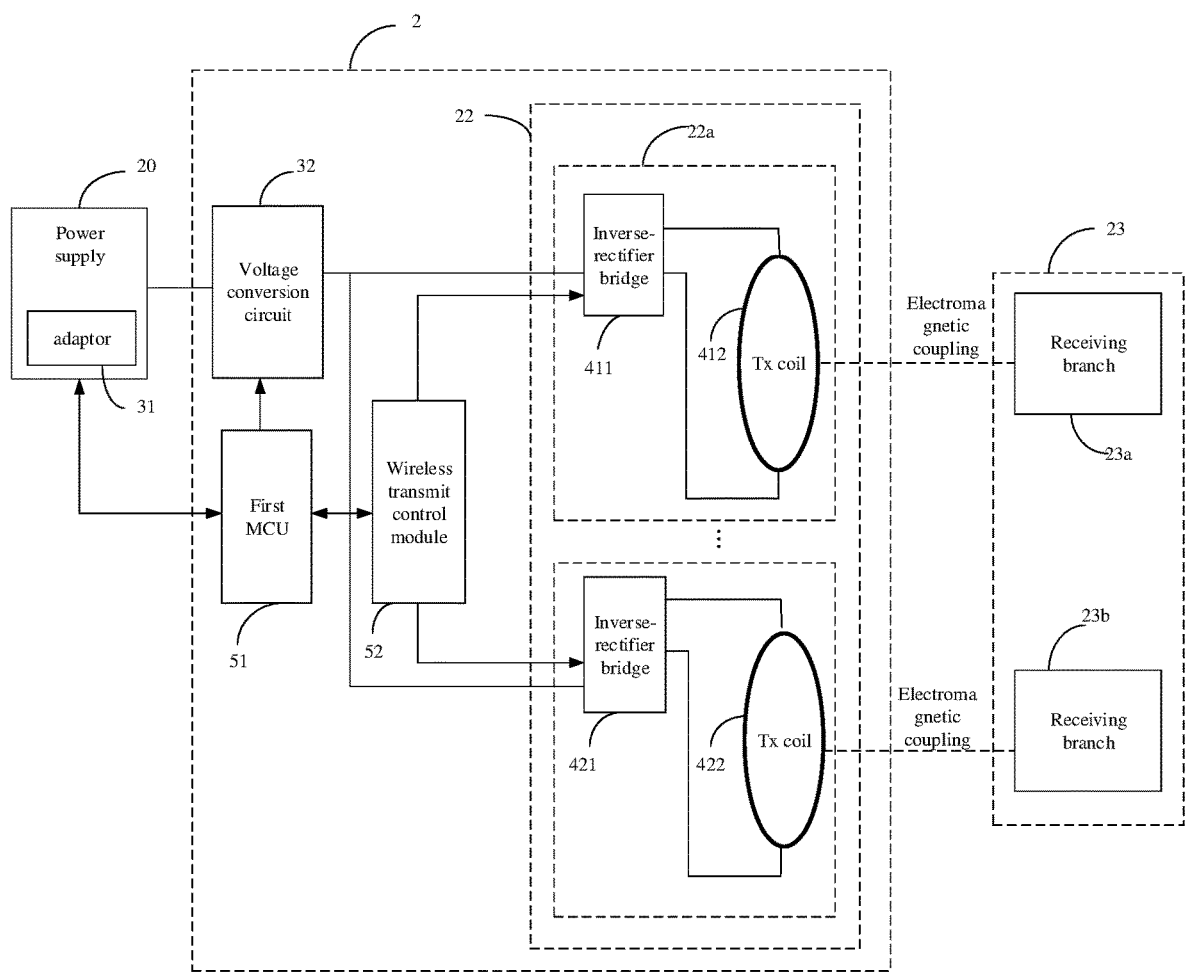
FIG. 5 is a structural schematic view IV of a wireless charging device according to an embodiment of the present disclosure.

The wireless charging device transmits the input current and the input voltage to an inverse-rectifier bridge in each of the at least two transmitting branches. The inverse-rectifier bridge in each transmitting branch performs the voltage regulation of DC to AC conversion on the transmitted input current and the transmitted input voltage to obtain one path of transmitting current and one path of transmitting voltage. Further, the Tx coil in the respective transmitting branch generates the electromagnetic signal (power signal) based on the circuit of transmitting current and the circuit of transmitting voltage, and the electromagnetic signal is transmitted to a correspondingly coupled receiving branch in the to-be-charged device. In some embodiments, the inverse-rectifier bridge includes a switching circuit consisting of at least one metal-oxide-semiconductor field-effect transistor tube (MOS tube). Operation of the inverse-rectifier bridge is controlled by controlling the switching circuit. For example, a voltage regulation parameter of the inverse-rectifier bridge may be determined by setting a duty cycle of the switching circuit and/or a switching frequency of the switching circuit. In some embodiments, as shown in FIG. 5, the transmit control module 21 includes a first microcontroller unit (MCU) 51 and a wireless transmit control module 52. The first MCU 51 is connected to the voltage conversion circuit 32 and the wireless transmit control module 52. The wireless transmit control module 52 is connected to at least two transmitting branches 22. The first MCU 51 is configured to control the voltage conversion circuit 32 and the wireless transmit control module 52 to operate, and configured to provide abnormal protection for the voltage conversion circuit 32 and the wireless transmit control module 52. The wireless transmit control module 52 is configured to control each inverse-rectifier bridge to operate in response to the to-be-charged device 23 being in a constant-current charging phase. The wireless transmit control module 52 is configured to control at least one inverse-rectifier bridge of the at least two transmitting branches 22 to operate and control the remaining inverse-rectifier bridge of the at least two transmitting branches 22 to stop operating in response to the to-be-charged device 23 being in a non-constant-current charging phase. The remaining inverse-rectifier bridge refers to any inverse-rectifier bridge other than the at least one inverse-rectifier bridge of the at least two transmitting branches 22.

When the wireless transmit control module 52 receives a constant-current charging command wirelessly from the to-be-charged device, the wireless transmit control module 52 determines that the to-be-charged device is in the constant-current charging phase, and controls the inverse-rectifier bridge in each of the at least two transmitting branches to operate, such that all transmitting branches transmit a plurality of transmitting currents and a plurality of transmitting voltages to charge the to-be-charged device. When the wireless transmit control module 52 receives a non-constant-current charging command wirelessly from the to-be-charged device, the wireless transmit control module 52 determines that the to-be-charged device is in the non-constant-current charging phase, controls at least on inverse-rectifier bridge in at least one of the at least two transmitting branches to operate, and controls the remaining counter-rectifier bridge in the remaining transmitting branches to stop operating. The remaining transmitting branches refer to transmitting branches of the at least two transmitting branches other than the at least one transmitting branch.

In some embodiments, the non-constant current charging phase includes a trickle charging phase and a constant-voltage charging phase. In some embodiments, the transmitting branch, which is in the at least two transmitting branches and supports the standard wireless charging protocol, may be taken as the at least one transmitting branch. The transmitting branch, which is in the at least two transmitting branches and supports the non-standard wireless charging protocol, may be taken as the remaining transmitting branch. An inverse-rectifier bridge in the at least one transmitting branch is the at least one inverse-rectifier bridge as described in the above. In addition, all transmitting branches may be taken as the at least one transmitting branches as described in the above. To be noted that, while the to-be-charged device is being charged, a charging power required by the battery in the to-be-charged device may be variable. For example, in the constant-current charging phase, the charging power required by the battery increases as the battery voltage increases. When the to-be-charged device is in the constant-voltage charging phase, a charging power required by the battery gradually decreases. In this way, for different charging phases, since the charging current and charging voltage required by the battery are different, that is, the charging power required by the battery is various, all transmitting branches or some of the all transmitting branches may be controlled to emit electromagnetic signals in the different charging phases; alternatively, all transmitting branches may be controlled to emit electromagnetic signals in the entire charging process.

In some embodiments, the wireless transmit control module 52 controls the switching circuit in the inverse-rectifier bridge to be disconnected or connected by controlling the input voltage of the inverse-rectifier bridge. When the switching circuit is connected, the inverse-rectifier bridge may operate. When the switching circuit is disconnected, the inverse-rectifier bridge may stop operating. Further, the wireless transmit control module 52 further controls the voltage regulation parameters of the inverse-rectifier bridge by controlling the input voltage of the inverse-rectifier bridge and by controlling the duty cycle and/or the switching frequency of the switching circuit.

In some embodiments, the wireless transmit control module 52 adjusts the transmitting power of the electromagnetic signal of at least one transmitting branch based on the charging parameters, the desired charging power, the desired current or the desired voltage. The operation may include following operations. The wireless transmit control module 52 adjusts an initial voltage regulation parameter corresponding to the voltage conversion circuit of each of the at least one transmitting branch based on the charging parameters and the preset charging parameter thresholds. The voltage conversion circuit is further configured to adjust the initial input current and the initial input voltage based on the adjusted initial voltage regulation parameters to obtain an input current after voltage regulation and an input voltage after voltage regulation, and configured to transmit the input current after voltage regulation and the input voltage after voltage regulation to the at least one transmitting branch. Further, a process of each of the at least one transmitting branch generating the electromagnetic signals based on the input current after voltage regulation and the input voltage after voltage regulation may be the same as a process of generating at least two circuits of electromagnetic signals based on the input current and input voltage, and thus will not be repeatedly described hereinafter. To be noted that adjusting the initial voltage regulation parameter of the voltage conversion circuit changes the input current and the input voltage transmitted to the transmitting branch, further changing the transmitting power of the electromagnetic signal transmitted by each transmitting branch. In this way, the output current, the output voltage and the charging power of the correspondingly coupled receiving branch may be changed.

In some embodiments, the operation of the wireless transmit control module 52 adjusting the transmitting power of the electromagnetic signal of at least one transmitting branch based on the charging parameters, the desired charging power, the desired current or the desired voltage may include following operations. The wireless transmit control module 52 adjusts the switching duty cycle and/or the switching frequency of the inverse-rectifier bridge of each of the at least one transmitting branch based on the charging parameters and the preset charging parameter thresholds. The inverse rectifier bridge is further configured to perform voltage regulation of DC to AC conversion on the input current and the input voltage based on the adjusted switching duty cycle and/or the adjusted switching frequency to obtain a first adjusted transmitting current and a first adjusted transmitting voltage, and configured to transmit the first adjusted transmitting current and the first adjusted transmitting voltage to the respective transmitting coil of the transmitting branch. The respective transmitting coil of the transmitting branch is configured to generate a first electromagnetic signal based on the first adjusted transmitting current and the first adjusted transmitting voltage and to transmit the first electromagnetic signal to the correspondingly coupled receiving branch in the to-be-charged device.

Further, the process of each transmitting branch transmitting the first electromagnetic signal to the correspondingly coupled receiving branch in the to-be-charged device may be the same as the process of transmitting the electromagnetic signal to the correspondingly coupled receiving branch in the to-be-charged device, and thus will not be repeatedly described hereinafter. To be noted that adjusting the switching duty cycle and/or the switching frequency of the inverse-rectifier bridge may change the transmitting current and the transmitting voltage transmitted by each transmitting branch. In this way, the transmitting power of the electromagnetic signal transmitted by each transmitting branch is changed in order to change the output current, the output voltage and the charging power of the correspondingly coupled receiving branch.

Figure 6:
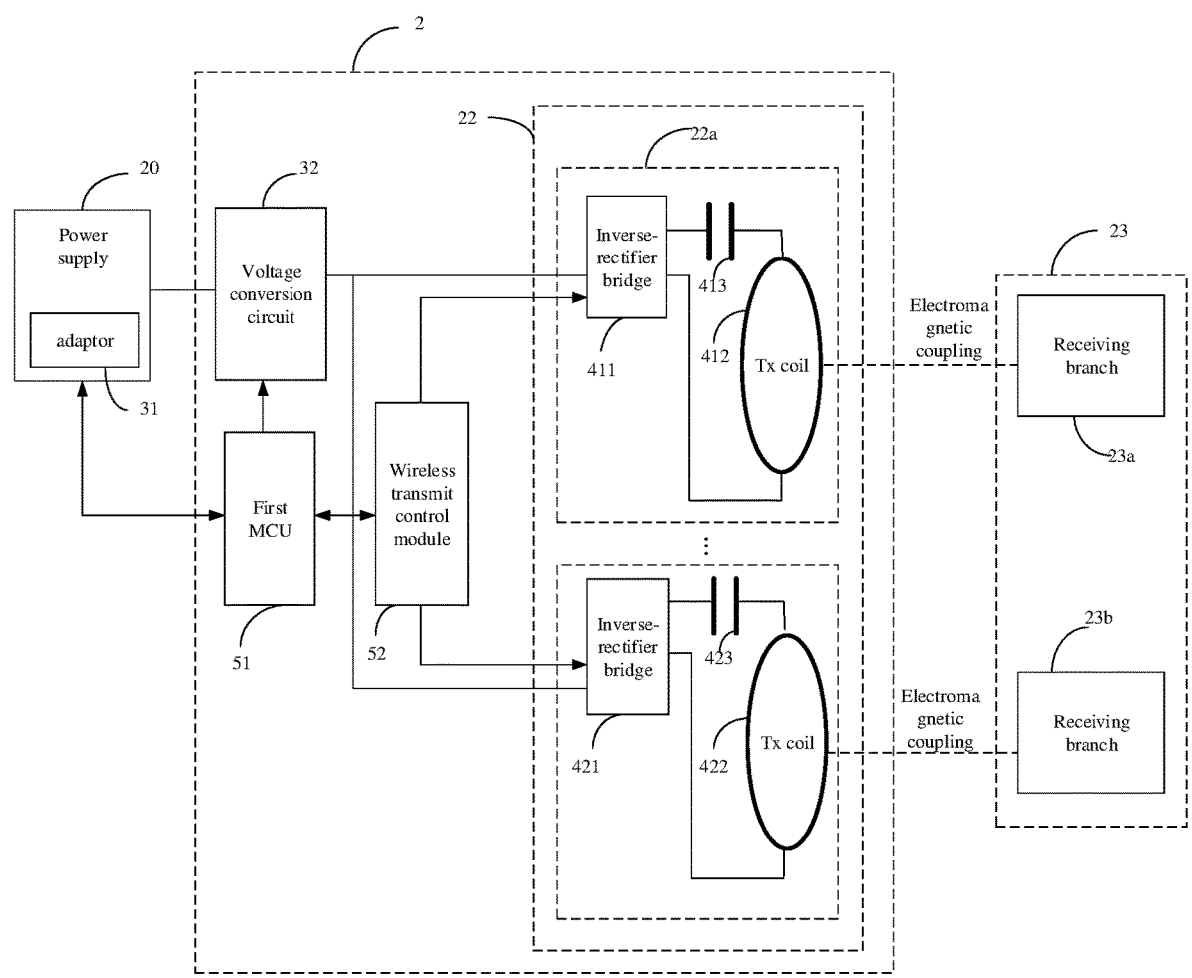
FIG. 6 is a structural schematic view V of a wireless charging device according to an embodiment of the present disclosure.

In some embodiments, as shown in FIG. 6, the transmit control module includes the wireless transmit control module 52. The wireless transmit control module 52 is connected to at least two transmitting branches 22 (such as the transmitting branch 22a and the transmitting branch 22b). A capacitor (such as a capacitor 413, a capacitor 423) is configured between the inverse-rectifier bridge and the transmit coil of each of the at least two transmitting branches 22. The transmit coil and the capacitor of each transmitting branch form a resonant circuit. The wireless transmit control module 52 is further configured to adjust the transmitting power of the electromagnetic signal of at least one transmitting branch based on the charging parameters, the desired charging power, the desired current or the desired voltage. The wireless transmit control module 52 adjusts a resonant frequency of the resonant circuit of each of the at least one transmitting branch based on the charging parameters and the preset charging parameter thresholds. Each transmitting branch performs the voltage regulation of the DC to AC conversion on the input current and the input voltage based on the adjusted resonant frequency to obtain a second adjusted transmitting current and a second adjusted transmitting voltage. Each transmitting branch transmits the second adjusted transmitting current and the second adjusted transmitting voltage to the respective transmitting coil of the transmitting branch. The respective transmitting coil of the transmitting branch is configured to generate a second electromagnetic signal based on the second adjusted transmitting current and the second adjusted transmitting voltage, and configured to transmit the second electromagnetic signal to a correspondingly coupled receiving branch (such as the receiving branch 23a, the receiving branch 23b) in the to-be-charged device 23.

Further, the process of each transmitting branch transmitting the second electromagnetic signal to the correspondingly coupled receiving branch in the to-be-charged device may be the same as the process of transmitting the electromagnetic signal to the correspondingly coupled receiving branch in the to-be-charged device, and thus will not be repeatedly described hereinafter. To be noted that, adjusting the resonant frequency of the resonant circuit in the transmitting branch changes the transmitting current and the transmitting voltage transmitted by each transmitting branch, such that the transmitting power of the electromagnetic signal transmitted by each transmitting branch may be changed to further change the output current, the output voltage and the charging power of the correspondingly coupled receiving branch. Further, the wireless transmit control module 52 adjusting the transmitting power of the electromagnetic signal of the transmitting branch may be achieved by at least one of: adjusting the initial voltage regulation parameter corresponding to the voltage conversion circuit of the transmitting branch, adjusting the switching duty cycle and/or the switching frequency of the inverse-rectifier bridge of the transmitting branch, and adjusting the resonant frequency of the resonant circuit in the transmitting branch.

In some embodiments, the wireless transmit control module 52 is further configured to establish handshake communication with the to-be-charged device 23 based on a preset wireless communication protocol to control receipt of real-time charging parameters. The wireless charging device presets the wireless communication protocol to perform the handshake communication with the to-be-charged device. When the handshake communication with the to-be-charged device is established, charging of the to-be-charged device may start, and thus feedback information is received. The preset wireless communication protocol is a wireless communication protocol supported by the wireless charging device itself. It shall be understood that a plurality of transmitting branches generate a plurality of transmitting currents and a plurality of transmitting voltages, and a plurality of electromagnetic signals are transmitted to the to-be-charged device at the same time. In this way, the charging power to the to-be-charged device is doubled by the plurality of electromagnetic signals, significantly improving the charging power.

Figure 7:
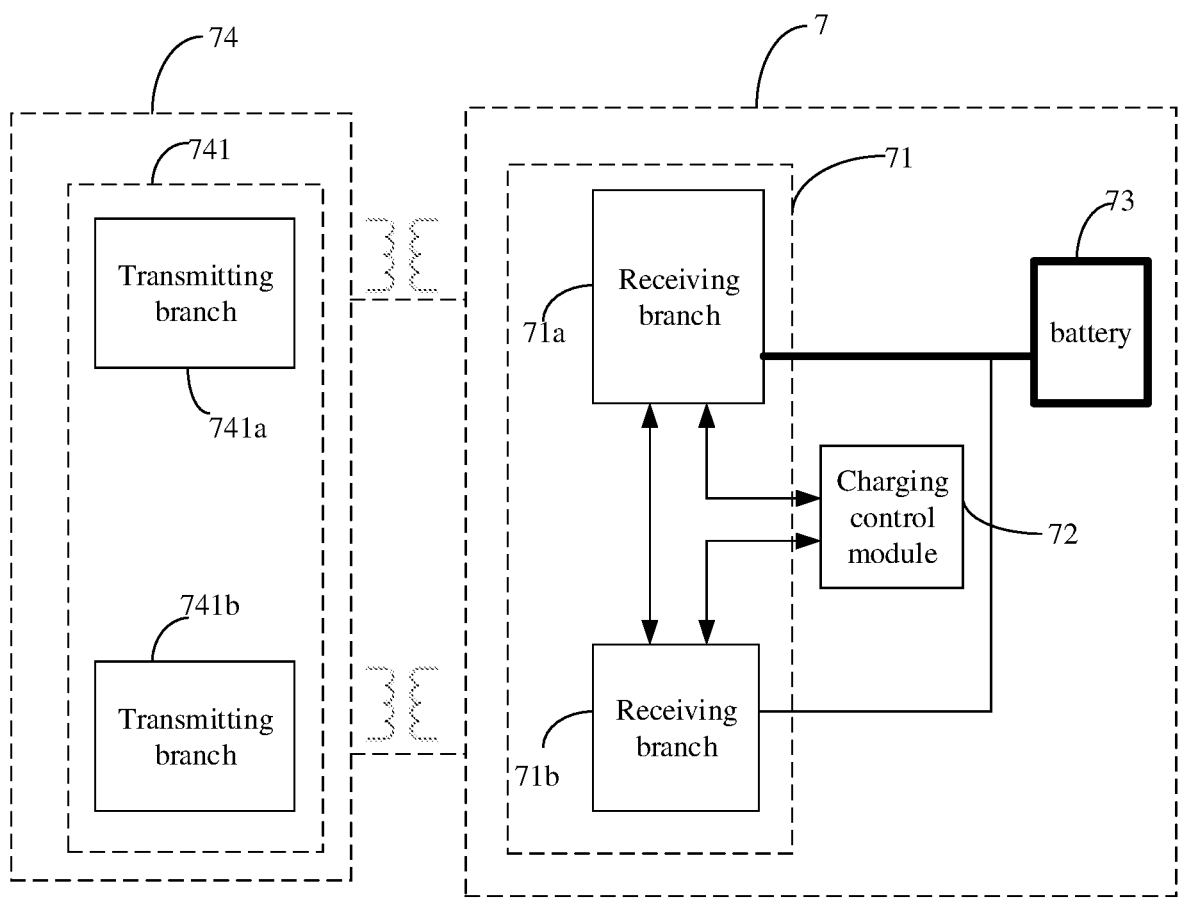
FIG. 7 is a structural schematic view I of a to-be-charged device according to an embodiment of the present disclosure.

The present disclosure provides a to-be-charged device, as shown in FIG. 7. The to-be-charged device 7 includes: at least two receiving branches 71 (such as a receiving branch 71a and a receiving branch 71b), a charging control module 72 and a battery 73. Each receiving branch of the at least two receiving branches 71 is connected to the charging control module 72 and the battery 73. Each receiving branch is configured to couple to one transmitting branch of the wireless charging device 74 to receive the electromagnetic signal from the coupled transmitting branch, and configured to convert the received electromagnetic signal into a charging voltage and a charging current for charging the battery 73 of the to-be-charged device 7. The charging control module 72 is configured to generate the feedback information based on at least one of following charging parameters and to feed the feedback information to the wireless charging device 74. The charging parameters include: a charging voltage of the battery 73, a charging current of the battery 73, a voltage of each receiving branch and a current of a first receiving branch. The feedback information is configured to instruct the wireless charging device 74 to adjust the transmitting power of the electromagnetic signal of each transmitting branch 741 (such as the transmitting branch 741a, the transmitting branch 741b).

Each receiving branch of the to-be-charged device receives one electromagnetic signal transmitted by one coupled transmitting branch, generates one charging voltage and one charging current based on the received one electromagnetic signal, and transmits the generated charging voltage and the generated charging current to the battery. In this way, at least two receiving branches of the to-be-charged device receive at least two electromagnetic signals transmitted by at least two transmitting branches, and at least two charging voltages and at least two charging currents are generated based on the at least two electromagnetic signals, such that a plurality of charging voltages and a plurality of charging currents may be applied to charge the battery. The battery stores the at least two charging voltages and the at least two charging currents transmitted by the at least two receiving branches to provide power for to-be-charged device to operate normally.

In some embodiments, the charging voltage of the battery 73 is a voltage input to battery 73, and the charging current of the battery 73 is a current input to the battery 73. In some embodiments, the voltage of each receiving branch may be a voltage at any point on a charging path of the receiving branch, as long as the voltage of the point can reflect a voltage of the respective receiving coil in the receiving branch. Similarly, the current of each receiving branch may be a current at any point on the charging path of the receiving branch, as long as the current of the point can reflect a current of the respective receiving coil in the receiving branch. Embodiments of the present disclosure does not limit the current and the voltage of each receiving branch.

In some embodiments, the charging control module includes a second MCU and/or an application processor (AP). In some embodiments, the charging control module may be at least two charging control modules. Each of the at least two receiving branches is controlled by an independent charging control module. The at least two charging control modules include a master control module. The master control module communicates with the wireless charging device and so on. The master control module is a part of a master receiving branch. The master receiving branch may be a receiving branch that supports the standard wireless charging protocol. In some embodiments, the to-be-charged device is in handshake communication with the wireless charging device based on the preset wireless charging protocol. When the handshake communication with the wireless charging device is established, the to-be-charged device starts receiving the plurality of electromagnetic signals, generates feedback information, and provides the feedback information to the wireless charging device. Further, when the wireless charging device receives the feedback information, the wireless charging device adjusts the transmitting voltage, the transmitting current and/or the transmitting power of at least one transmitting branch based on the feedback information and the preset charging parameters. In this way, the voltage and/or the current of at least one receiving branch coupled to the transmitting branch may be changed to change the charging current and/or the charging voltage of the battery.

In some embodiments, the battery in the to-be-charged device includes a single electric core or a plurality of electric cores. When the battery includes the plurality of electric cores, the voltages and the currents of the plurality of receiving branches may be loaded together to two ends of the plurality of electric cores to charge the plurality of electric cores; alternatively, each receiving branch may charge one electric core correspondingly. The present disclosure does not limit a form and a circuit structure of how the plurality of receiving branches charge the plurality of electric cores.

Figure 8:
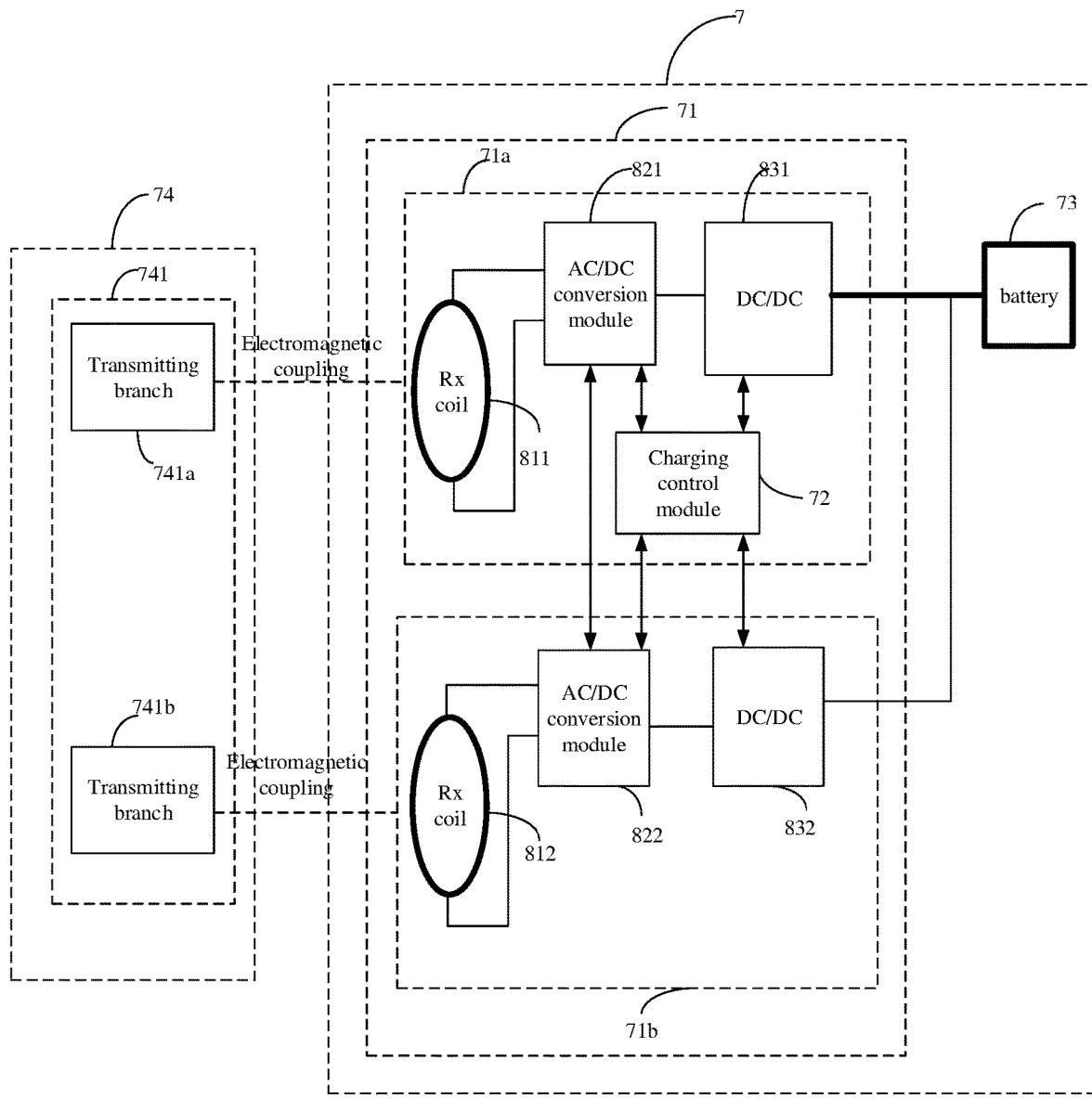
FIG. 8 is a structural schematic view II of a to-be-charged device according to an embodiment of the present disclosure.

In some embodiments, as shown in FIG. 8, each receiving branch of the at least two receiving branches 71 includes a receiving coil (such as a Rx coil 811, a Rx coil 812), a AC/DC conversion module (such as an AC/DC conversion module 821, an AC/DC conversion module 822), and a voltage conversion circuit (such as DC/DC 831, a DC/DC 832). The AC/DC conversion module is connected to the receiving coil and the voltage conversion circuit in the respective receiving branch, and the voltage conversion circuit is electrically connected to the battery 73. Each of the voltage conversion circuit and the AC/DC conversion module is connected to the charging control module 72. The receiving coil is configured to receive one path of electromagnetic signal transmitted from a transmitting branch correspondingly coupled to the respective receiving branch. The AC/DC conversion module is configured to convert one path of electromagnetic signal received by the receiving coil in the respective receiving branch to a direct current. The voltage conversion circuit is configured to perform the voltage and the current conversion on the direct current to obtain the charging voltage and the charging current for charging the battery 73. To be noted that, the charging control module 72 shown in FIG. 8 is configured in the receiving branch 71*a*, which does not indicate that the charging control module 72 belongs to the receiving branch 71*a*.

The receiving coil of each receiving branch receives one path of electromagnetic signal transmitted by the transmitting coil in the correspondingly coupled transmitting branch. The AC/DC conversion module in the respective receiving branch converts the received electromagnetic signal into the direct current. The voltage conversion circuit in the respective receiving branch performs the voltage and/or the current conversion on the direct current to generate one path of charging current and one path of charging voltage, and provides the generated charging current and the generated charging voltage to the battery.

In some embodiments, as shown in FIG. 8, the voltage of each receiving branch includes an output voltage of the AC/DC conversion module (such as the AC/DC conversion module 821 or the AC/DC conversion module 822). The output voltage of the AC/DC conversion module may be an output voltage of the receiving coil in the respective receiving branch or a voltage on the charging path in the respective receiving branch (such as a voltage output by the AC/DC conversion module in the respective receiving branch or a voltage input to the DC/DC in the respective receiving branch). The output voltage of the AC/DC conversion module may reflect the voltage of the receiving coil. Exemplarily, taking the AC/DC conversion module 821 as an example, the output voltage of the AC/DC conversion module 821 may be an output voltage of the Rx coil 811, a voltage output by the AC/DC conversion module 821, or a voltage input to the DC/DC 831.

In some embodiments, as shown in FIG. 8, a current of each receiving branch includes an output current of the AC/DC conversion module (such as the AC/DC conversion module 821 or the AC/DC conversion module 822). The output current of the AC/DC conversion module may be an output current of the receiving coil in the respective receiving branch or a current on the charging path in the respective receiving branch (such as a current output by the AC/DC conversion module in the respective receiving branch or a current input to the DC/DC in the respective receiving branch). The output current of the AC/DC conversion module may reflect the current of the receiving coil. Exemplarily, taking the AC/DC conversion module 821 as an example, the output current of the AC/DC conversion module 821 may be an output current of the Rx coil 811, a current output by the AC/DC conversion module 821, or a current input to the DC/DC 831.

Figure 9A:
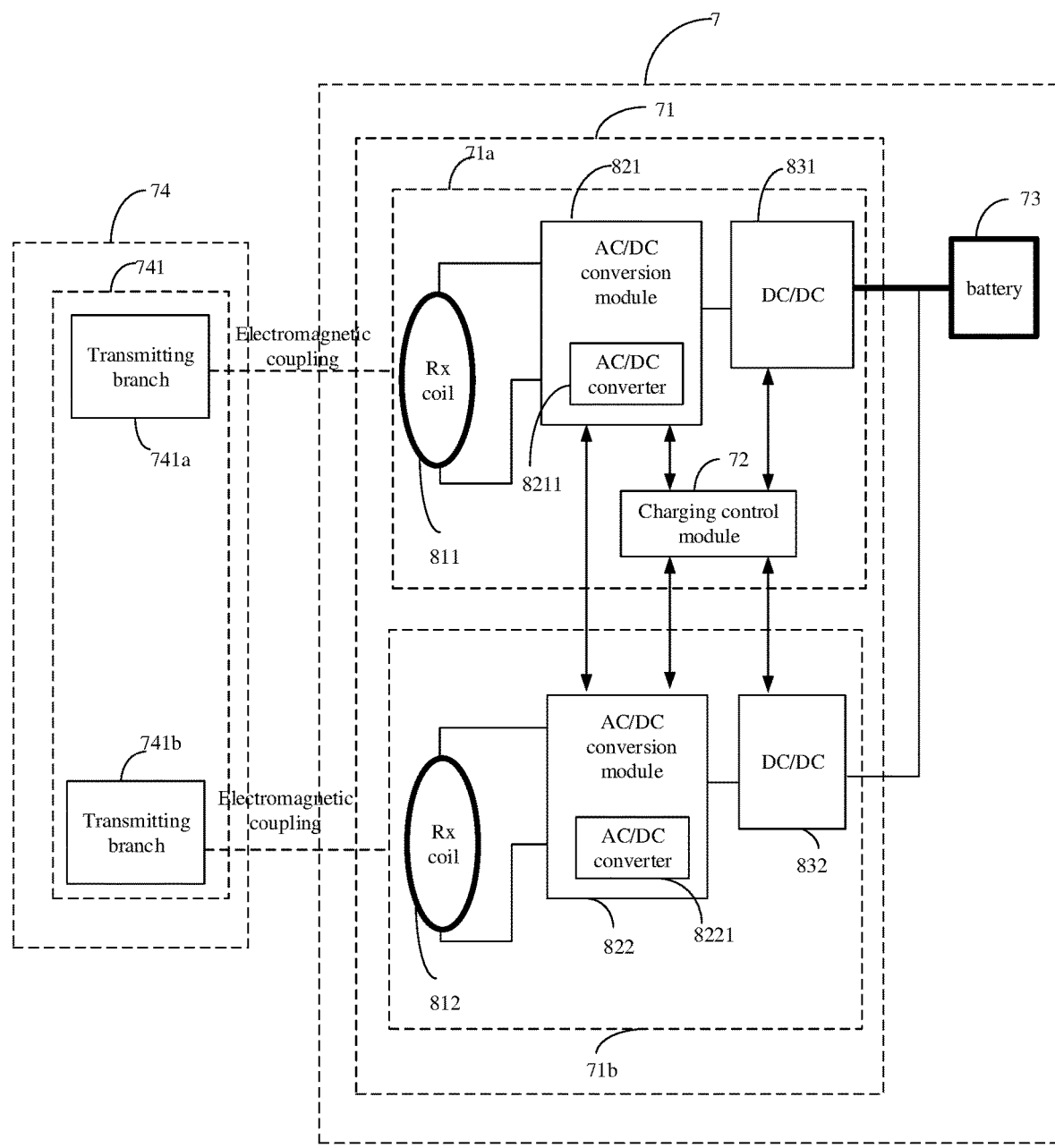
FIG. 9a is a structural schematic view III of a to-be-charged device according to an embodiment of the present disclosure.

In some embodiments, as shown in FIG. 9*a*, the AC/DC conversion module in each receiving branch includes an AC/DC converter (such as an AC/DC converter 8211, an AC/DC converter 8221). The AC/DC converter is connected to the receiving coil and the voltage conversion circuit in the respective receiving branch. The AC/DC converter is configured to perform the voltage regulation of AC to DC conversion on one path of electromagnetic signal received by the receiving coil in the respective receiving branch. The AC/DC conversion module is configured to rectify and filter the electromagnetic signal to obtain the direct current. In addition, the AC/DC conversion module is further configured to control a voltage magnitude and a current magnitude of the direct current. Alternatively, the AC/DC conversion module is controlled by the second MCU or the AP in the charging control module, and the MCU or the AP controls the voltage magnitude and the current magnitude of the direct current.

In some embodiments, the charging control module is further configured to determine the desired charging power based on the charging voltage and/or the charging current of the battery; and configured to take the desired charging power as the feedback information and provide the feedback information to the wireless charging device, such that the wireless charging device adjusts the transmitting power of the electromagnetic signal transmitted by each transmitting branch based on the feedback information.

The charging control module obtains a total charging voltage and/or a total charging current provided by all receiving branches to the battery, and obtains the desired charging power based on the total charging voltage and/or the total charging current. Further, the desired charging power may be taken as the feedback information, and provided to the wireless charging device. In this way, the wireless charging device adjusts the transmitting power of the electromagnetic signal transmitted by each of the at least one transmitting branch based on the desired charging power.

In some embodiments, the voltage of each receiving branch includes one output voltage of the AC/DC conversion module, and the current of each receiving branch includes one output current of the AC/DC conversion module. The charging control module is further configured to determine the desired current based on at least two output currents and/or at least two output voltages corresponding to at least two receiving branches; and configured to take the desired current as the feedback information and provide the feedback information to the wireless charging device, such that the wireless charging device adjusts the transmitting power of the electromagnetic signal based on the feedback information.

The charging control module determines one desired current corresponding to each receiving branch based on the output current and/or the output voltage of the AC/DC conversion module in each receiving branch, such that at least two desired currents corresponding to at least two receiving branches are obtained. The charging control module determines the desired current, which can be taken as the feedback information, from the at least two desired currents. The desired current that is taken as the feedback information may be a maximum value of the at least two desired currents or a desired current corresponding to the master receiving branch of the at least two receiving branches.

In some embodiments, the current of each receiving branch includes one output current of the AC/DC conversion module. The charging control module is further configured to determine the desired charging power based on the charging voltage and/or the charging current of the battery; configured to determine the desired current based on at least two output currents corresponding to at least two receiving branches; and configured to determine the desired voltage based on the desired charging power and the desired current, take the desired voltage as the feedback information, and provide the feedback information to the wireless charging device. In this way, the wireless charging device adjusts the transmitting power of the electromagnetic signal based on the feedback information.

The charging control module multiplies the charging voltage of the battery by the charging current of the battery to obtain the charging power of the battery. The charging control module obtains the charging power threshold and the current threshold from the preset charging parameters and calculates the desired charging power based on the charging power threshold and the charging power of the battery. The charging control module determines one desired current from all output currents and/or all output voltages corresponding to all receiving branches. The charging control module compares the desired charging power and the charging power threshold, and compares the desired current and the current threshold. The charging control module determines the desired voltage while ensuring that the desired charging power does not exceed the charging power threshold, and ensuring that the desired current does not exceed the current threshold. The charging control module provides the desired voltage to the wireless charging device.

In some embodiments, the voltage of each receiving branch includes an output voltage of the AC/DC conversion module. The charging control module is further configured to compare the desired voltage and the output voltage to obtain a voltage difference. The charging control module is further configured to take the voltage difference as the feedback information and provide the feedback information to the wireless charging device, such that the wireless charging device adjusts the transmitting power of the electromagnetic signal based on the feedback information. After determining the desired voltage, the charging control module is configured to compare (such as obtain a difference value) the desired voltage and the output voltage of the AC/DC conversion module in at least one receiving branch to obtain the voltage difference, and provide the voltage difference to the wireless charging device. In some embodiments, the charging control module is further configured to send feedback information, which indicates increasing the transmitting voltage or decreasing the transmitting voltage, to the wireless charging device. The charging control module determines the desired voltage based on the charging voltage of the battery, the charging current of the battery, and the output voltage and/or the output current of the AC/DC conversion module in each receiving branch. Subsequently, the charging control module obtains the voltage threshold from the preset charging parameters and compares the voltage threshold and the desired voltage to obtain the voltage difference, such that the feedback information, which indicates increasing the transmitting voltage or decreasing the transmitting voltage, is generated.

In some embodiments, the charging control module is further configured to establish handshake communication with the wireless charging device to transmit the feedback information based on the preset wireless communication protocol.

In some embodiments, the to-be-charged device further includes a charging control module. The charging control module is configured to control at least one of the at least two receiving branches to operate to charge the battery based on a charging mode or a charging phase of the battery. The charging mode includes a first charging mode and a second charging mode. A charging rate of the first charging mode is greater than a charging rate of the second charging mode. Charging phases of the battery include at least one of: the trickle charging phase, the constant-current charging phase, and the constant-voltage charging phase.

To be noted that, in an embodiment, the first charging mode may correspond to the constant-current charging phase, and the second charging mode may correspond to the trickle charging phase and/or the constant-voltage charging phase.

In another embodiment, the charging mode may not correspond to any charging phase, that is, the charging mode may correspond to a charging speed. For example, in a fast charging mode which has a high charging speed, when the desired charging power is greater than a preset value, the battery may be in the first charging mode, and at least two receiving branches may operate simultaneously. In another case, in a normal charging mode which has a smaller charging speed, the battery may be in the second charging mode, and only one of the at least two receiving branches may operate. In this case, in the first charging mode, operation of certain receiving branches may be consistent with the constant-current charging phase. In the second charging mode, operation of the certain receiving branch may be consistent with the trickle charging phase and/or the constant-voltage charging phase.

In some embodiments, the charging control module is further configured to control the at least two receiving branches to operate simultaneously when the battery is in the constant-current charging phase. The charging control module is further configured to control at least one of the at least two receiving branches to operate when the battery is in the non-constant-current charging phase.

When the battery is in the constant-current charging phase, the charging control module sends a constant-current charging command to the wireless charging device, such that the wireless charging device controls at least two transmitting branches to operate normally to transmit electromagnetic signals to at least two correspondingly coupled receiving branches, ensuring that at least two receiving branches operate. When the battery is in the non-constant-current charging phase, the charging control module sends a non-constant-current charging command to the wireless charging device, such that the wireless charging device controls at least one transmitting branch correspondingly coupled to at least one receiving branch to operate normally, and the at least one transmitting branch transmits the electromagnetic signal to the at least one receiving branch, ensuring that at least one receiving branch operates. At the same time, the wireless charging device controls the remaining transmitting branch correspondingly coupled to the remaining receiving branch to stop operating. The remaining transmitting branch does not transmit the electromagnetic signal to the remaining receiving branch. The remaining receiving branch stops operating. The remaining receiving branch is a receiving branch of the at least two receiving branches other than the at least one receiving branch.

Figure 9B:
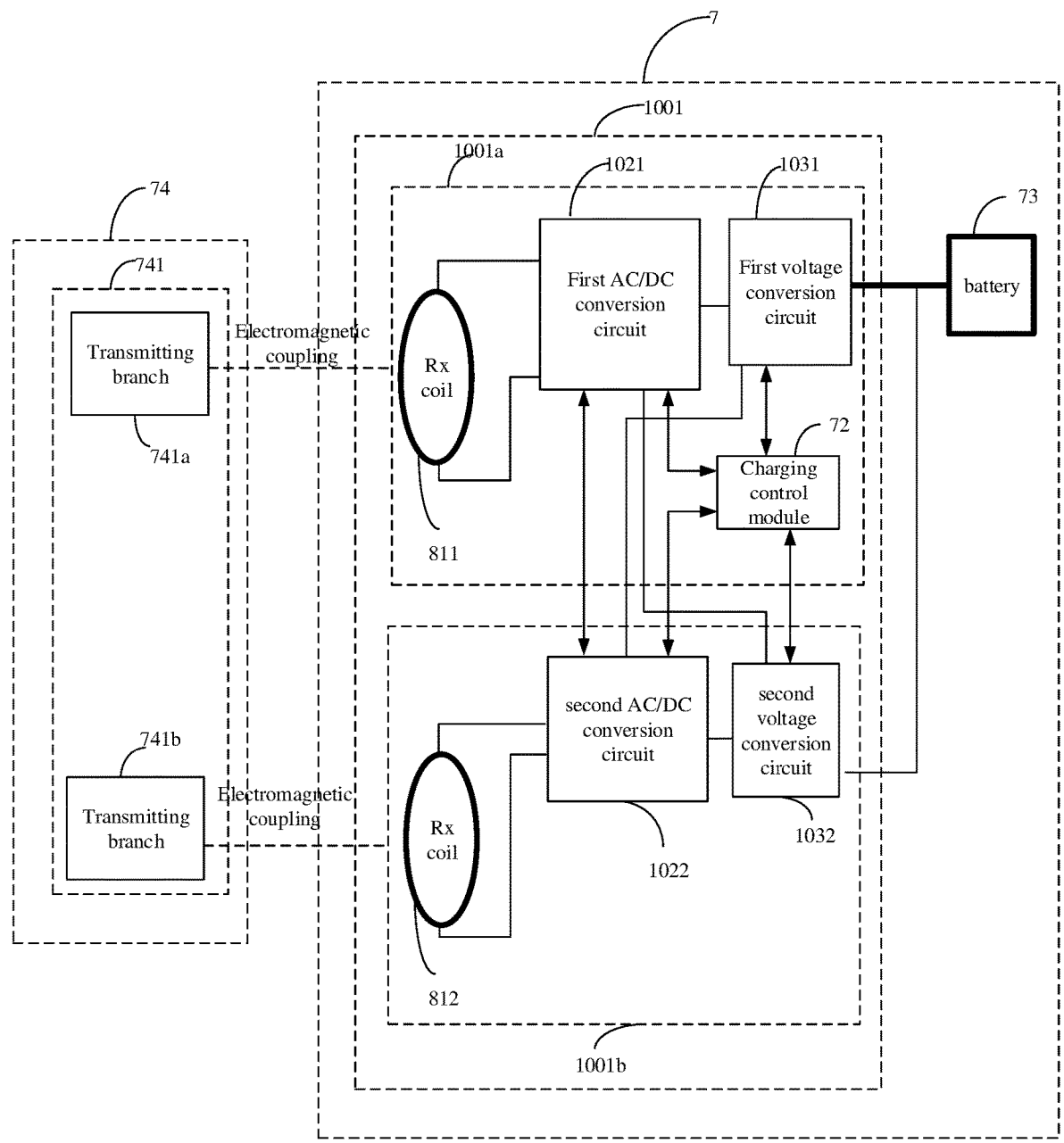
FIG. 9b is a structural schematic view IV of a to-be-charged device according to an embodiment of the present disclosure.

In some embodiments, in addition to the to-be-charged device in FIG. 9a, as shown in FIG. 9b, the at least two receiving branches 1001 include a first receiving branch 1001a and a second receiving branch 1001b. The first receiving branch 1001a includes a first AC/DC conversion circuit 1021 and a first voltage conversion circuit 1031. The second receiving branch 1001b includes a second AC/DC conversion circuit 1022 and a second voltage conversion circuit 1032. The first voltage conversion circuit 1031 is connected to the first AC/DC conversion circuit 1021 and the second AC/DC conversion circuit 1022. The second voltage conversion circuit 1032 is connected to the first AC/DC conversion circuit 1021 and/or the second AC/DC conversion circuit 1022. The charging control module 72 is further configured to control the first voltage conversion circuit 1031 to operate in the constant-current charging phase, and to control the second voltage conversion circuit 1032 to operate in the trickle charging phase and/or the constant-voltage charging phase.

The first voltage conversion circuit 1031 may be a charge pump circuit, and the second voltage conversion circuit 1032 may be a buck circuit, a buck-boost circuit, or a charging integrated circuit.

To be noted that, as shown in FIG. 9b, the first voltage conversion circuit 1031 is connected to the first AC/DC conversion circuit 1021 and the second AC/DC conversion circuit 1022 at the same time. In this case, while in the constant-current charging phase, the battery 73 may be charged by two charging paths (receiving branches) at the same time through the first voltage conversion circuit 1031. In FIG. 9*b*, the second voltage conversion circuit 1032 is connected to the first AC/DC conversion circuit 1021 and the second AC/DC conversion circuit 1022 at the same time. In this case, while in the trickle charging phase and/or the constant-voltage charging phase, the battery 73 may be charged by two charging paths at the same time through the second voltage conversion circuit 1032.

In addition, the second voltage conversion circuit 1032 may be connected to only one AC/DC conversion circuit (the first AC/DC conversion circuit 1021 or the second AC/DC conversion circuit 1022). In this case, while in the trickle charging phase and/or the constant-voltage charging phase, the battery 73 may be charged by one charging path through the second voltage conversion circuit 1032. That is, when the second voltage conversion circuit 1032 is connected to the first AC/DC conversion circuit 1021, while in the trickle charging phase and/or the constant-voltage charging phase, the battery 73 may be charged by a first charging path through the first AC/DC conversion circuit 1021 and the second voltage conversion circuit 1032. When the second voltage conversion circuit 1032 is connected to the second AC/DC conversion circuit 1022, while in the trickle charging phase and/or the constant-voltage charging phase, the battery 73 may be charged by a second charging path through the second AC/DC conversion circuit 1022 and the second voltage conversion circuit 1032.

In some embodiments, the charging control module is further configured to control each receiving branch to operate or stop operating by controlling an operation switch in each receiving branch.

In some embodiments, the charging control module is further configured to detect a charging state of the to-be-charged device; and configured to send a stop-charging command to the wireless charging device when the charging state conforms to an abnormal charging state. The stop-charging command is configured to instruct the wireless charging device to stop transmitting the electromagnetic signal to stop the wireless charging device from providing the transmitting power to the to-be-charged device. The abnormal charging state includes: remaining power information of the battery being greater than a preset power value; and/or a battery temperature being greater than a preset temperature; and/or the charging voltage of the battery being greater than a preset voltage; and/or the charging current of the battery being greater than a preset current.

The charging control module is further configured to detect at least one of: the remaining power information of the battery, the battery temperature, the charging voltage of the battery and the charging current of the battery. The charging control module is further configured to determine the charging state of the to-be-charged device based on detected information. The charging control module is further configured to control the wireless charging device to stop transmitting the electromagnetic signal through the stop-charging command when the charging state conforms to the abnormal charging state.

In some embodiments, the charging control module is further configured to obtain the remaining power information of the battery. When the remaining power is greater than the preset power value, the charging control module generates the top-charging command and sends the top-charging command to the wireless charging device. The stop-charging command is configured to instruct the wireless charging device to stop transmitting the electromagnetic signal.

The charging control module is configured to determine whether the remaining power information of the battery is greater than the preset power value. When the remaining power is greater than the preset power value, the charging control module determines that the battery is fully charged, generates the stop-charging command, and sends the top-charging command to the transmit control module in the wireless charging device.

In some embodiments, the charging control module is further configured to generate the stop-charging command and send the stop-charging command to the wireless charging device when the charging voltage of the battery and the charging current of the battery meet preset charging values. The stop-charging command is configured to instruct the wireless charging device to stop transmitting the electromagnetic signal.

The charging control module is further configured to determine whether the charging voltage of the battery and the charging current of the battery meet the preset charging values. When the preset charging values are met, the charging control module determines that the battery is fully charged and generates the stop-charging command. The preset charging values may include a preset current value and a preset voltage value. When the charging voltage of the battery is less than the preset voltage value, and/or the charging current of the battery is less than the preset current value, the charging control module determines that the charging voltage of the battery and the charging current of the battery meet the preset charging values.

In some embodiments, the AC/DC conversion module further includes a switch controlling module. The switch controlling module is configured to control a respective receiving branch, which is configured with the switch controlling module, to be disconnected when a current or a voltage transmitted in the respective receiving branch, which is configured with the switch controlling module, is greater than a preset abnormal threshold, such that the charging process is stopped.

The switch controlling module performs over-current protection and over-voltage protection on the battery based on the preset abnormal threshold. When the current or the voltage transmitted in the respective receiving branch, which is configured with the switch controlling module, is greater than the preset abnormal threshold, the respective receiving branch, which is configured with the switch controlling module, may be disconnected, such that charging through the respective receiving branch, which is configured with the switch controlling module, may be stopped. The preset abnormal threshold includes am abnormal current threshold and an abnormal voltage threshold.

In some embodiments, the voltage conversion circuit in at least one of the at least two receiving branches is the buck circuit, the buck-boost circuit, or the charging integrated circuit (charging IC). Alternatively, the voltage conversion circuit in each of the at least two receiving branches is the charge pump circuit.

In some embodiments, the voltage conversion circuit in the remaining receiving branch is the charge pump circuit. The remaining receiving branch is any receiving branch of the at least two receiving branches other than the at least one receiving branch as described in the above.

To be noted that, a ratio of the input voltage to the output voltage of the charge pump circuit may be 1:1, 2:1, 3:1, . . . , N:1, and so on. In addition, the charging IC may be an integration of an identification circuit, a low dropout regulator (LDO) circuit, a buck/boost circuit, a path management circuit, a temperature detection circuit, and so on. The present disclosure does not limit the charging IC.

In some embodiments, the at least two receiving branches include the first receiving branch and the second receiving branch. A voltage conversion circuit in the first receiving branch is the buck circuit, the boost-buck circuit or the charging IC. A voltage conversion circuit in the second receiving branch is the charge pump circuit. The charging control module is configured to control the first receiving branch and the second receiving branch to operate simultaneously when the battery is in the constant-current charging phase. The charging control module is configured to control the first receiving branch to operate simultaneously when the battery is in the non-constant-current charging phase.

When the to-be-charged device includes two receiving branches, the voltage conversion circuit in the first receiving branch may be the buck circuit, the boost-buck circuit or the charging IC, and the second receiving branch may be the charge pump circuit. Since the charge pump circuit has a higher charging speed, the first receiving branch and the second receiving branch may be controlled to operate at the same time in the constant-current charging phase. In this way, the battery may be charged with a larger charging power. In the non-constant-current charging phase, the first receiving branch may be controlled to operate, and the second receiving branch may be controlled to not operate, such that the battery may be charged with a smaller charging power.

In some embodiments, the charging control module is further configured to control one of the at least two receiving branches to operate and control the remaining receiving branch of the at least two receiving branches to not operate, when the wireless charging device is detected to include only one transmitting branch. A voltage conversion circuit in the one receiving branch that is controlled to operate may be the buck circuit, the boost-buck circuit or the charging IC.

Alternatively, a maximum transmitting power of the wireless charging device may be obtained. When the obtained maximum transmitting power is less than the preset power threshold, the charging control module controls one of the at least two receiving branches to operate and controls the remaining receiving branch of the at least two receiving branches to not operate. The voltage conversion circuit in the receiving branch that is controlled to operate may be the buck circuit, the boost-buck circuit, or the charging IC.

When the charging control module determines that the wireless charging device includes one transmitting branch, the charging control module may control one receiving branch that corresponds to the only one transmitting branch to operate. The receiving branch that corresponds to the only one transmitting branch may be a branch that supports the same wireless charging protocol as the only one transmitting branch. Alternatively, the receiving branch that corresponds to the only one transmitting branch may be a branch that establishes handshake communication with the only one transmitting branch.

Figure 10:
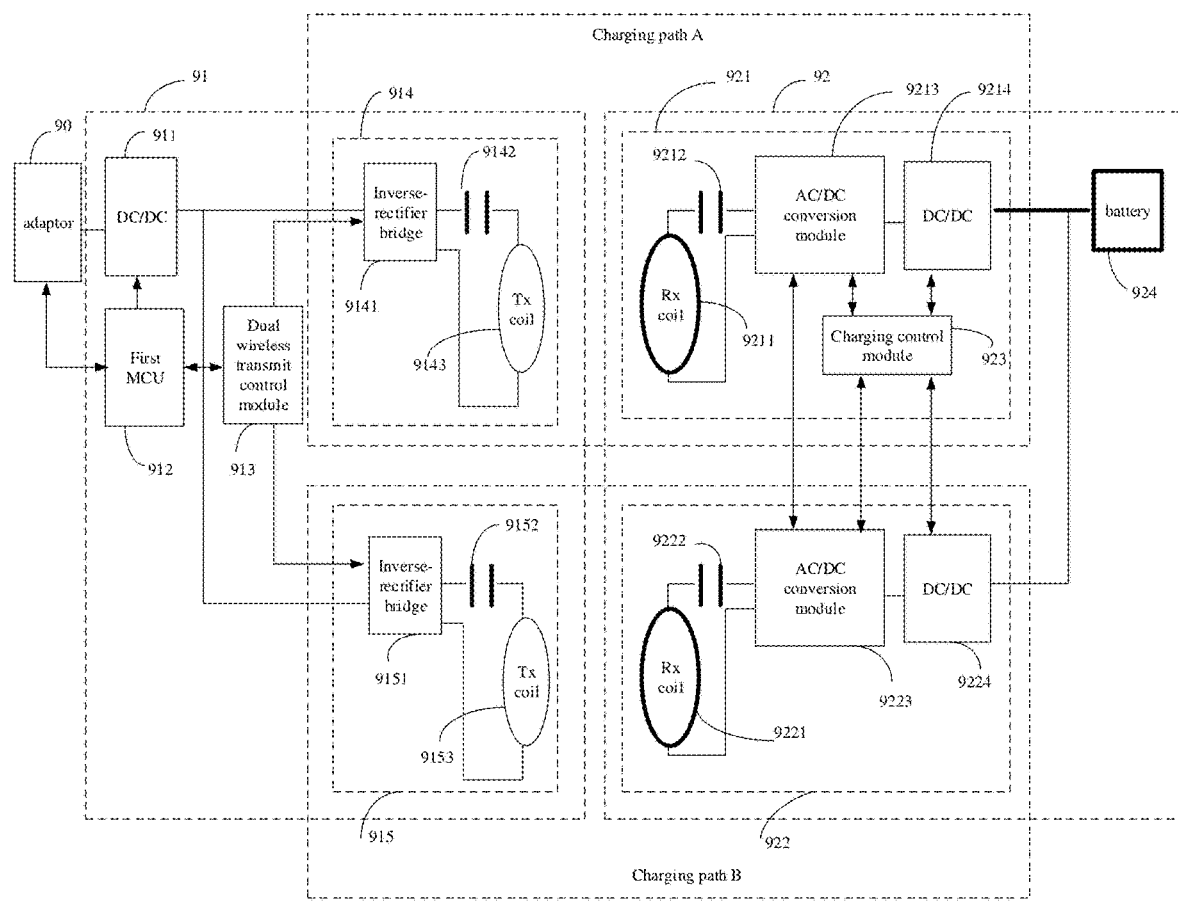
FIG. 10 is a structural schematic view I of a charging system according to an embodiment of the present disclosure.

Exemplarily, FIG. 10 provides a charging system. The charging system includes: an adapter 90, a wireless charging device 91 and a to-be-charged device 92. The wireless charging device 91 includes a DC/DC 911, a first MCU 912, a dual wireless transmit control module 913, a transmitting branch 914 and a transmitting branch 915. The transmitting branch 914 includes a inverse-rectifier bridge 9141, a transmitting capacitor 9142 and a transmitting coil (Tx coil) 9143. The transmitting branch 915 includes an inverse-rectifier bridge 9151, a transmitting capacitor 9152 and a transmitting coil (Tx coil) 9153. The to-be-charged device 92 includes a receiving branch 921, a receiving branch 922, a charging control module 923 and a battery 924. The receiving branch 921 includes a receiving coil (Rx coil) 9211, a receiving capacitor 9212, an AC/DC conversion module 9213 and a DC/DC 9214. The receiving branch 922 includes a receiving coil (Rx coil) 9221, a receiving capacitor 9222, an AC/DC conversion module 9223 and a DC/DC 9224. The charging control module 923 is a second MCU or an AP.

A charging path A is formed by the transmitting branch 914 and the corresponding receiving branch 921. A charging path B is formed by the transmitting branch 915 and the corresponding receiving branch 922.

The adapter 90 connects to the first MCU 912 and the DC/DC 911. The DC/DC 911 connects to the first MCU 912, the inverse-rectifier bridge 9141 and the inverse-rectifier bridge 9151. The first MCU 912 connects to an end of the dual wireless transmit control module 913, and the other end of the dual wireless transmit control module 913 connects to the inverse-rectifier bridge 9141 and the inverse-rectifier bridge 9151. The inverse-rectifier bridge 9141, the transmitting capacitor 9142 and the Tx coil 9143 are connected in series. The inverse-rectifier bridge 9151, the transmitting capacitor 9152 and the Tx coil 9153 are connected in series. The Tx coil 9143 and the Rx coil 9211 are electrically connected by electromagnetic coupling. The Tx coil 9153 and the Rx coil 9221 are electrically connected by electromagnetic coupling.

The Rx coil 9211, the receiving capacitor 9212, and the AC/DC conversion module 9213 are connected in series. The AC/DC conversion module 9213 is connected to the AC/DC conversion module 9223 and the DC/DC 9214. The charging control module 923 is connected to the AC/DC conversion module 9213, the DC/DC 9214, the AC/DC conversion module 9223, and the DC/DC 9224. The DC/DC 9214 and the DC/DC 9224 are connected to the battery 924.

To be noted that FIG. 10 shows that the charging control module 923 is configured in the receiving branch 921, which does not indicate that the charging control module 923 is a part of the receiving branch 921.

When the adapter 90 is connected to the power supply, an initial input current and an initial input voltage are transmitted to the DC/DC 911, the DC/DC 911 may boost the initial input current and the initial input voltage to obtain the input current and the input voltage. The input current and the input voltage are transmitted to the transmitting branch 914 and the transmitting branch 915 at the same time. The inverse-rectifier bridge 9141 of the transmitting branch 914 performs DC to AC conversion on the input voltage and the input current to generate one transmitting current and one transmitting voltage corresponding to the transmitting branch 914. The inverse-rectifier bridge 9151 of the transmitting branch 915 performs the DC to AC conversion on the input voltage and the input current to generate one transmitting current and one transmitting voltage corresponding to the transmitting branch 915.

Further, the Tx coil 9143 generates one electromagnetic signal corresponding to the transmitting branch 914 based on the transmitting current and the transmitting voltage corresponding to transmitting branch 914. The electromagnetic signal corresponding to the transmitting branch 914 is transmitted to the Rx coil 9211. The AC/DC conversion module 9213 performs voltage regulation of AC to DC conversion on the electromagnetic signal received by the Rx coil 9211 to obtain one receiving current and one receiving voltage. The DC/DC 9214 performs the voltage regulation of AC to DC conversion on the receiving current and the receiving voltage to generate one charging current and one charging voltage, and provides the generated charging current and the generated charging voltage to the battery to charge the battery.

At the same time, the Tx coil 9153 generates one electromagnetic signal corresponding to the transmitting branch 915 based on the one transmitting current and the one transmitting voltage corresponding to the transmitting branch 915, and transmits the one electromagnetic signal corresponding to the transmitting branch 915 to the Rx coil 9221. The AC/DC conversion module 9223 performs the voltage regulation of AC to DC conversion on the one electromagnetic signal received by the Rx coil 9221 to obtain one receiving current and one receiving voltage. The DC/DC 9224 performs the voltage regulation on the one receiving current and the one receiving voltage to generate one charging current and one charging voltage, and provides the generated charging current and the generated charging voltage to the battery to charge the battery.

Further, the dual wireless transmit control module 913 adjusts magnitude of one transmitting current and magnitude of one transmitting voltage of the transmitting branch 914 by setting the voltage regulation parameters of the DC/DC 911, setting a resonant frequency of the transmitting capacitor 9142 in the transmitting branch 914, and setting the switching duty cycle and/or the switching frequency of the inverse-rectifier bridge 9141. In this way, changing the charging power corresponding to the transmitting branch 914 may be achieved. In addition, the process of adjusting the charging power corresponding to the transmitting branch 915 may be the same as the process of adjusting the charging power corresponding to the transmitting branch 914, which will not be repeated here.

The charging path A supports a first wireless charging protocol, and the charging path B supports a second wireless charging protocol. The first wireless charging protocol may be the standard wireless charging protocol (such as the Qi protocol) or the non-standard wireless charging protocol. The second wireless charging protocol may be the same as or different from the first wireless charging protocol.

Exemplarily, the charging path A supports the Qi protocol, and the charging path B supports the non-standard wireless charging protocol. In this way, the charging path B is not limited by the charging power of the standard wireless charging protocol, a relatively large charging power may be applied for charging, further improving the charging efficiency.

Further, the dual wireless transmit control module 913 controls the inverse-rectifier bridge 9141 and the inverse-rectifier bridge 9151 to operate when the battery is in the constant-current charging phase, that is, the battery is charged through the charging path A and the charging path B. The dual wireless transmit control module 913 controls the inverse-rectifier bridge 9141 to operate, and controls the inverse-rectifier bridge 9151 to stop operating, when the battery is in the non-constant-current charging phase, that is, the charging path B stops operating, such that the battery may be charged through the charging path A.

Exemplarily, when the charging path B is operating in the constant-current charging phase, the DC/DC 9224 in the charging path B may be the charge pump circuit. The charging power of the charge pump circuit may be higher than that of the buck circuit and that of the boost-buck circuit. In this way, the charging power in the constant-current charging stage may be increased significantly.

To be noted that, when the charging system takes two charging paths for charging, the two charging paths may be evenly distributed based on spaces (such as distributed at a top and at a bottom, distributed at a left and at a right, and so on). In this way, heat dissipation of the charging system may be uniform, temperature increase of the charging system may be controlled effectively.

Figure 11:
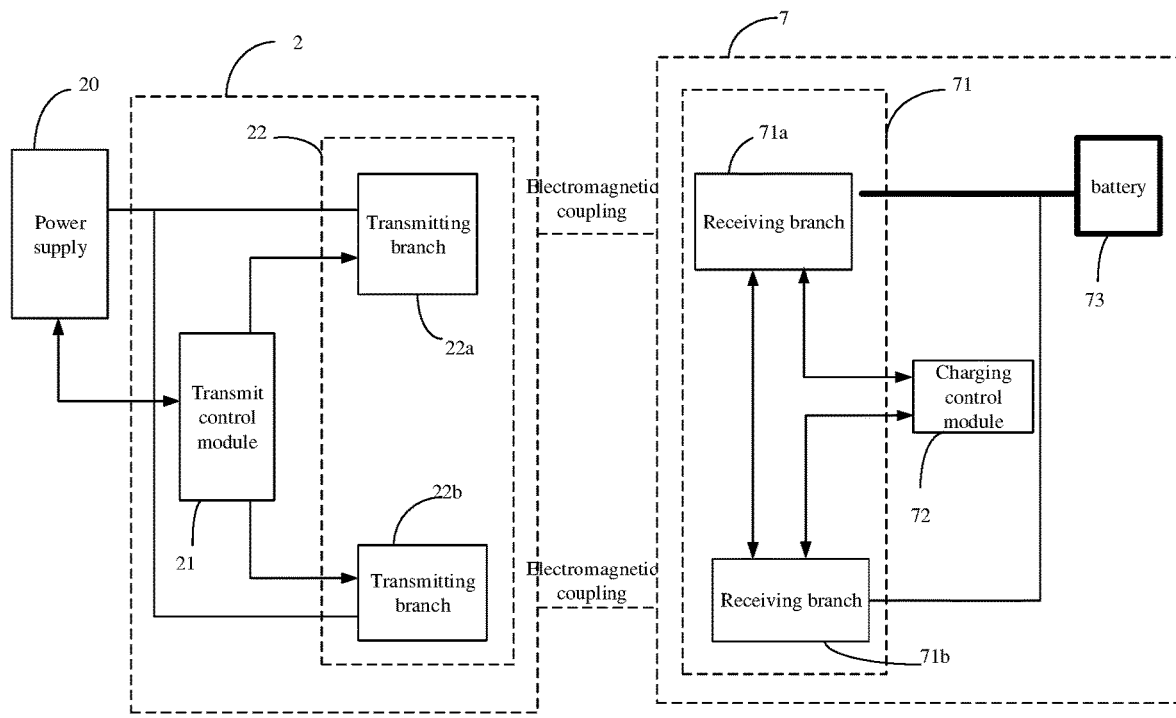
FIG. 11 is a structural schematic view II of a charging system according to an embodiment of the present disclosure.

In some embodiments, as shown in FIG. 11, the charging system includes a power supply 20, a wireless charging device 2 and a to-be-charged device 7. The wireless charging device 2 includes a transmit control module 21 and at least two transmitting branches 22 (such as a transmitting branch 22*a* and a transmitting branch 22*b*). The to-be-charged device 7 includes at least two receiving branches 71 (such as a receiving branch 71*a* and a receiving branch 71*b*), a charging control module 72 and a battery 73. Each of the at least two transmitting branches 22 is electrically connected to the power supply 20. Each of the at least two transmitting branches 22 is connected to the transmit control module 21. The transmit control module 21 is electrically connected to the power supply 20. Each of the at least two receiving branches 71 is connected to the charging control module 72 and the battery 73. Each receiving branch is coupled to one of the at least two transmitting branches 22 via electromagnetic coupling. The transmit control module 21 is configured to control the input current and the input voltage provided by the power supply 20 to the at least two transmitting branches 22. Each transmitting branch is configured to generate one path of electromagnetic signal based on the input current and the input voltage, and configured to transmit the generated electromagnetic signal to one of the at least two receiving branches 71 that is correspondingly coupled to the transmitting branch. The transmit control module 21 is further configured to receive feedback information sent by the to-be-charged device 7, and configured to adjust the transmitting power of the electromagnetic signal of each transmitting branch based on the feedback information. Each receiving branch is configured to receive the electromagnetic signal transmitted by the coupled transmitting branch, and configured to convert the received electromagnetic signal into the charging voltage and the charging current for charging the battery 73 of the to-be-charged device 7. The charging control module 72 is configured to generate feedback information based on at least one of following charging parameters and provide the feedback information to the wireless charging device 2. The charging parameters include: the charging voltage of the battery 73, the charging current of the battery 73, the voltage of each receiving branch and the current of each receiving branch. The feedback information is configured to instruct the wireless charging device 2 to adjust the transmitting power of the electromagnetic signal of each transmitting branch.

In some embodiments, the charging control module in the to-be-charged device is configured to determine the desired charging power based on the charging voltage and/or the charging current of the battery; and configured to take the desired charging power as the feedback information and provide the desired charging power to the wireless charging device. The transmit control module in the wireless charging device is further configured to adjust the transmitting power of the electromagnetic signal of each transmitting branch based on the desired charging power.

In some embodiments, the charging control module in the to-be-charged device is further configured to determine the desired current based on at least two output currents and/or at least two output voltages corresponding to the at least two receiving branches, and configured to take the desired current as feedback information and provide the desired current to the wireless charging device. The transmit control module in the wireless charging device is further configured to adjust the transmitting power of the electromagnetic signal of each transmitting branch based on the desired current.

In some embodiments, the charging control module in the to-be-charged device is configured to determine the desired charging power based on the charging voltage and/or the charging current of the battery, configured to determine the desired current based on at least two output currents corresponding to the at least two receiving branches, and configured to determine the desired voltage based on the desired charging power and the desired current, take the desired voltage as feedback information and provide the desired voltage to the wireless charging device. The transmit control module in the wireless charging device is further configured to adjust the transmitting power of the electromagnetic signal of each transmitting branch based on the desired voltage.

In some embodiments, the charging control module in the to-be-charged device is further configured to compare the desired voltage to the output voltage to obtain a voltage difference, and configured to take the voltage difference as the feedback information and provide the voltage difference to the wireless charging device. The transmit control module in the wireless charging device is further configured to adjust the transmitting power of the electromagnetic signal of the transmitting branch coupled to each receiving branch based on the voltage difference.

In some embodiments, the charging control module in the to-be-charged device is further configured to send feedback information to the wireless charging device for increasing the transmitting voltage or decreasing the transmitting voltage. The transmit control module in the wireless charging device is further configured to receive the feedback information sent from the to-be-charged device for increasing the transmitting voltage or decreasing the transmitting voltage.

It shall be understood that, a plurality of receiving branches obtain a plurality of paths of electromagnetic signals, such that a plurality of paths of charging currents and a plurality of paths of charging voltages are generated based on the plurality of paths of electromagnetic signals. The battery is charged through the plurality of paths of charging currents and the plurality of paths of charging voltages simultaneously. The charging power of the battery is doubled while charging the battery through the plurality of paths of charging currents and the plurality of paths of charging voltages, such that the charging power is increased significantly.

A same inventive concept based on the above embodiments will be further described.

Figure 12:
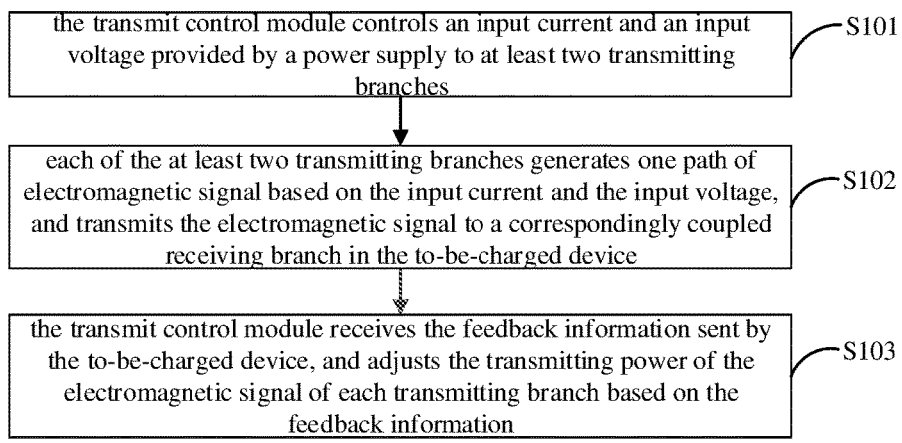
FIG. 12 is a flow chart of a charging method applied to a wireless charging device according to an embodiment of the present disclosure.

Embodiments of the present disclosure provide a charging method, applied to the wireless charging device as described above. As shown in FIG. 12. The charging method includes following operations.

In an operation S101, the transmit control module controls an input current and an input voltage provided by a power supply to at least two transmitting branches.

After the transmit control module in the wireless charging device establishes handshake communication with the to-be-charged device, the transmit control module starts receiving the input current and the input voltage for charging the to-be-charged device.

In an operation S102, each of the at least two transmitting branches generates one path of electromagnetic signal based on the input current and the input voltage, and transmits the electromagnetic signal to a correspondingly coupled receiving branch in the to-be-charged device.

In an operation S103, the transmit control module receives the feedback information sent by the to-be-charged device, and adjusts the transmitting power of the electromagnetic signal of each transmitting branch based on the feedback information.

In some embodiments, the feedback information includes charging parameters. The charging parameters are received through the transmit control module. The transmitting power of the electromagnetic signal of each transmitting branch is adjusted based on the charging parameters.

In some embodiments, the charging parameters include at least one of: the charging voltage of the battery, the charging current of the battery, the voltage of each receiving branch, and the current of each receiving branch.

In some embodiments, the transmit control module determines the desired charging power based on the charging voltage and/or the charging current of the battery, and adjusts the transmitting power of the electromagnetic signal of each transmitting branch based on the desired charging power.

In some embodiments, the transmit control module determines the desired current based on at least two output currents and/or at least two output voltages corresponding to the at least two receiving branches, and adjusts the transmitting power of the electromagnetic signal of each transmitting branch based on the desired current.

In some embodiments, the transmit control module determines the desired charging power based on the charging voltage and/or the charging current of the battery, determines the desired current based on at least two output currents corresponding to the at least two receiving branches, determines the desired voltage based on the desired charging power and the desired current, and adjusts the transmitting power of the electromagnetic signal of each transmitting branch based on the desired voltage.

In some embodiments, the transmit control module compares the desired voltage to the output voltage of each receiving branch to obtain a voltage difference, and adjusts the transmitting power of the electromagnetic signal of the transmitting branch coupled to each receiving branch based on the voltage difference.

It shall be understood that, a plurality of transmitting branches generate a plurality of paths of electromagnetic signals, the plurality of paths of electromagnetic signals are transmitted to the to-be-charged device simultaneously, and the charging power of the to-be-charged device is doubled by charging through the plurality of paths of electromagnetic signals, such that the charging power is significantly improved.

Embodiments of the present disclosure provide a charging method, applied to the to-be-charged device. As shown in FIG. 13, the charging method includes following operations.

In an operation S201, each of the at least two receiving branches receives the electromagnetic signal transmitted by a correspondingly coupled transmitting branch in the wireless charging device, and converts the received electromagnetic signal into the charging voltage and the charging current for charging the battery of the to-be-charged device.

In some embodiments, each receiving branch in the to-be-charged device receives one path of electromagnetic signal transmitted by a correspondingly coupled transmitting branch, and converts the electromagnetic signal to generate one path of charging voltage and one path of charging current.

In an operation S202, the charging control module generates feedback information based on at least one of following charging parameters and provides the feedback information to the wireless charging device. The charging parameters include: the charging voltage of the battery, the charging current of the battery, the voltage of each receiving branch and the current of each receiving branch. The feedback information is configured to instruct the wireless charging device to adjust the transmitting power of the electromagnetic signal of each transmitting branch.

In some embodiments, the AC/DC conversion module in each receiving branch converts the electromagnetic signal received by the receiving coil in the respective receiving branch to the direct current. The voltage conversion circuit in each receiving branch performs the voltage and/or the current conversion on the direct current to obtain the charging voltage and the charging current for charging the battery.

In some embodiments, the charging control module determines the desired charging power based on the charging voltage and/or the charging current of the battery, and takes the desired charging power as the feedback information and provides the desired charging power to the wireless charging device, such that the wireless charging device adjust the transmitting power of the electromagnetic signal transmitted by each transmitting branch based on the feedback information.

In some embodiments, the voltage of each receiving branch includes an output voltage of the AC/DC conversion module, and the current of each receiving branch includes an output current of the AC/DC conversion module. The charging control module determines the desired current based on at least two output currents and/or at least two output voltages corresponding to the at least two receiving branches, and takes the desired current as the feedback information and provides the desired current to the wireless charging device, such that the wireless charging device adjusts the transmitting power of the electromagnetic signal based on the feedback information.

In some embodiments, the current of each receiving branch includes an output current of the AC/DC conversion module. The charging control module determines the desired charging power based on the charging voltage and/or the charging current of the battery; determines the desired current based on at least two output currents corresponding to the at least two receiving branches; and determines the desired voltage based on the desired charging power and the desired current, takes the desired voltage as the feedback information and provides the desired voltage to the wireless charging device, such that the wireless charging device adjusts the transmitting power of the electromagnetic signal based on the feedback information.

In some embodiments, after each of the at least two receiving branches receives the electromagnetic signal transmitted by a correspondingly coupled transmitting branch of the wireless charging device and converts the received electromagnetic signal into the charging voltage and the charging current for charging the battery of the to-be-charged device, the charging method further include following operations. The charging control module detects a charging state of the to-be-charged device. When the charging state conforms to an abnormal charging state, the charging control module sends a stop-charging command to the wireless charging device. The stop-charging command is configured to instruct the wireless charging device to stop transmitting the electromagnetic signal, such that the wireless charging device stops providing the transmitting power to the to-be-charged device. The abnormal charging state includes: the remaining power of the battery being greater than a preset power value; and/or the battery temperature being greater than a preset temperature; and/or the charging voltage of the battery being greater than a preset voltage; and/or the charging current of the battery being greater than a preset current.

In some embodiments, after each of the at least two receiving branches receives the electromagnetic signals from a correspondingly coupled transmitting branch of the wireless charging device and converts the received electromagnetic signals into the charging voltage and the charging current for charging the battery of the to-be-charged device, the charging method further includes following operations. The charging control module obtains the remaining power of the battery. When the remaining power is greater than the preset power value, the charging control module generates the stop-charging command and sends the stop-charging command to the wireless charging device. The stop-charging command is configured to instruct the wireless charging device to stop transmitting the electromagnetic signal.

Figure 14:
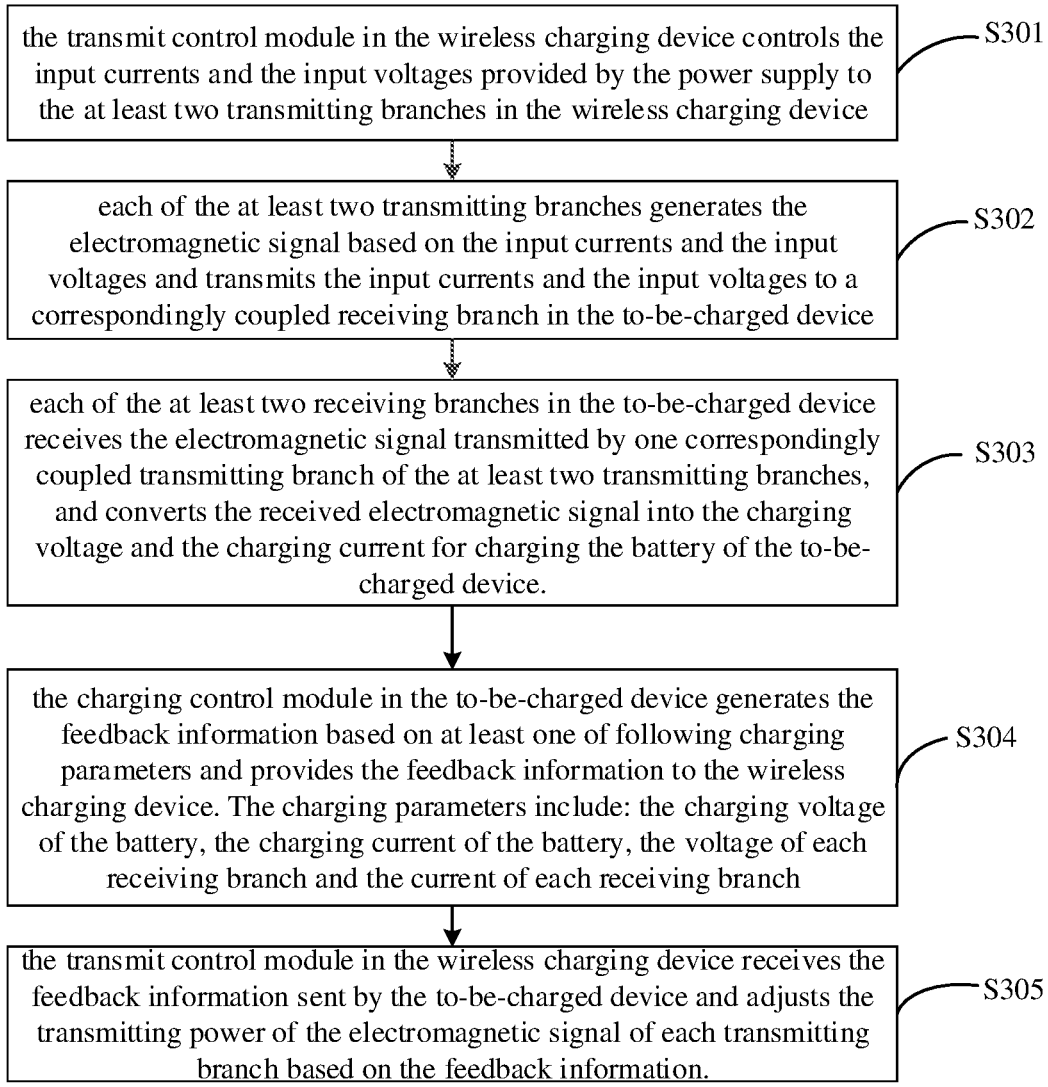
FIG. 14 is a flow chart of a charging method applied to a charging system according to an embodiment of the present disclosure.

Embodiments of the present disclosure provide a charging method, applied to the charging system in the Embodiment I, as shown in FIG. 14, the charging method includes following operations.

In an operation S301, the transmit control module in the wireless charging device controls the input currents and the input voltages provided by the power supply to the at least two transmitting branches in the wireless charging device.

In an operation S302, each of the at least two transmitting branches generates the electromagnetic signal based on the input currents and the input voltages and transmits the input currents and the input voltages to a correspondingly coupled receiving branch in the to-be-charged device.

In an operation S303, each of the at least two receiving branches in the to-be-charged device receives the electromagnetic signal transmitted by one correspondingly coupled transmitting branch of the at least two transmitting branches, and converts the received electromagnetic signal into the charging voltage and the charging current for charging the battery of the to-be-charged device.

In an operation S304, the charging control module in the to-be-charged device generates the feedback information based on at least one of following charging parameters and provides the feedback information to the wireless charging device. The charging parameters include: the charging voltage of the battery, the charging current of the battery, the voltage of each receiving branch and the current of each receiving branch.

In an operation S305: the transmit control module in the wireless charging device receives the feedback information sent by the to-be-charged device and adjusts the transmitting power of the electromagnetic signal of each transmitting branch based on the feedback information.

It shall be understood that, a plurality of receiving branches obtain a plurality of paths of electromagnetic signals, and the plurality of paths of charging currents and the plurality of paths of charging voltages are generated based on the plurality of paths of electromagnetic signals. The battery is charged by the plurality of paths of charging currents and the plurality of paths of charging voltages simultaneously. The charging power of the battery is doubled by charging through the plurality of paths of charging currents and the plurality of paths of charging voltages, the charging power may be significantly improved.

Embodiments of the present disclosure provide a computer-readable storage medium. The computer-readable storage medium stores one or more programs. The one or more programs are executable by one or more first processors to implement the charging method as applied to the to-be-charged device.

Embodiments of the present disclosure provide a computer-readable storage medium. The computer-readable storage medium stores one or more programs. The one or more programs are executable by one or more second processors to implement the charging method as applied to the wireless charging device.

Those skilled in the art shall understand that embodiments of the present disclosure may be provided as methods, systems, or computer program products. Accordingly, the present disclosure may take the form of a hardware embodiment, a software embodiment, or a combination of software and hardware aspects. Further, the present disclosure may take the form of a computer program product implemented on one or more computer-usable storage media (including, but not limited to, a disk memory, an optical memory, and so on) that includes computer-usable program codes therein.

The present disclosure is described by referring to flowcharts and/or block diagrams of methods, devices, and computer program products according to embodiments of the present disclosure. It shall be understood that each of the processes and/or blocks in the flowcharts and/or block diagrams, and combination of the processes and/or blocks in the flowcharts and/or block diagrams, may be implemented by computer program instructions. These computer program instructions may be provided to a processor of a general-purpose computer, a specialized computer, an embedded processor, or other programmable data processing device to produce a machine such that the instructions executed by the processor of the computer or other programmable data processing device produce a device for implementing the functions specified in one or more processes of the flowchart and/or one or more blocks of the block diagram.

These computer program instructions may also be stored in a computer readable memory capable of directing a computer or other programmable data processing device to operate in a particular manner, such that the instructions stored in the computer readable memory produce an article of manufacture including an instruction device that implements the function specified in one or more processes of a flowchart and/or one or more blocks of a block diagram.

The computer program instructions may also be loaded onto a computer or other programmable data processing devices such that a series of operations are performed on the computer or other programmable devices to produce computer-implemented processing such that the instructions executed on the computer or other programmable devices provide operations for implementing the functions specified in one or more processes of the flowchart and/or one or more blocks of the block diagram.

The above description shows only preferred embodiments of the present disclosure and is not intended to limit the scope of the present disclosure.

Embodiments of the present disclosure provides a wireless charging device, a to-be-charged device, a charging system, a charging method and a storage medium. The to-be-charged device includes: at least two receiving branches, a charging control module and a battery. Each of the at least two receiving branches is connected to the charging control module and the battery. Each receiving branch is configured to couple to one transmitting branch in the wireless charging device to receive the electromagnetic signal transmitted by the coupled transmitting branch and converts the received electromagnetic signal into a charging voltage and a charging current for charging the battery of the to-be-charged device. The charging control module is configured to generate feedback information based on at least one of following charging parameters and provide the feedback information to the wireless charging device. The charging parameters include: a charging voltage of the battery, a charging current of the battery, a voltage of each receiving branch and a current of each receiving branch. The feedback information is configured to instruct the wireless charging device to adjust the transmitting power of the electromagnetic signal of each transmitting branch. By performing the above technical solution, a plurality of receiving branches obtain a plurality of paths of electromagnetic signals, a plurality of paths of charging currents and a plurality of paths of charging voltages are generated based on the plurality of paths of electromagnetic signals. The battery is charged through the plurality of paths of charging currents and the plurality of paths of charging voltages simultaneously. The charging power of the battery is doubled by charging through the plurality of paths of charging currents and the plurality of paths of charging voltages, and the charging power is significantly improved.

What is claimed is:

1. A to-be-charged device, comprising: at least two receiving branches, a charging control module and a battery,
   wherein each receiving branch of the at least two receiving branches is connected to the charging control module and the battery;
   each receiving branch is configured to couple to one transmitting branch of a wireless charging device to receive an electromagnetic signal transmitted by the coupled transmitting branch and configured to convert the received electromagnetic signal into a charging voltage and a charging current for charging the battery of the to-be-charged device;
   the charging control module is configured to generate feedback information based on at least one of charging parameters and provide the feedback information to the wireless charging device,
   wherein the charging parameters comprise: a charging voltage of the battery, a charging current of the battery, a voltage of each receiving branch and a current of each receiving branch; and
   the feedback information is configured to instruct the wireless charging device to adjust a transmitting power of the electromagnetic signal of each transmitting branch;
   wherein the charging control module is further configured to control at least one of the at least two receiving branches to operate based on a charging phase of the battery to charge the battery; the charging phase comprises: a constant-current charging phase and a constant-voltage charging phase;
   the charging control module is further configured to:
   control the at least two receiving branches to operate simultaneously in response to the battery being in a constant-current charging phase; and
   control at least one of the at least two receiving branches to operate when the battery is in a non-constant-current charging phase.

2. The to-be-charged device according to claim 1, wherein
   the charging phase of the battery further comprises a trickle charging phase.

3. The to-be-charged device according to claim 1, wherein each receiving branch of the at least two receiving branches comprises a receiving coil, an alternating current/direct current (AC/DC) conversion module and a voltage conversion circuit;

the AC/DC conversion module is connected to the receiving coil and the voltage conversion circuit in a receiving branch in which the AC/DC conversion module is configured, the voltage conversion circuit is electrically connected to the battery, each of the voltage conversion circuit and the AC/DC conversion module is connected to the charging control module;

the receiving coil is configured to receive one path of electromagnetic signal transmitted by a transmitting branch correspondingly coupled to the receiving branch in which the receiving coil is configured;

the AC/DC conversion module is configured to convert the electromagnetic signal received by the receiving coil in the receiving branch in which the AC/DC conversion module is configured into a direct current; and the voltage conversion circuit is configured to perform a voltage and/or a current conversion on the direct current to obtain the charging voltage and the charging current for charging the battery.

4. The to-be-charged device according to claim 3, wherein the voltage of each receiving branch comprises one output voltage of the AC/DC conversion module, and the current of each receiving branch comprises one output current of the AC/DC conversion module; and the charging control module is further configured to:

determine a desired current based on at least two output currents and/or at least two output voltages corresponding to the at least two receiving branches; and take the desired current as the feedback information and provide the feedback information to the wireless charging device, enabling the wireless charging device to adjust the transmitting power of the electromagnetic signal based on the feedback information.

5. The to-be-charged device according to claim 3, wherein the current of each receiving branch comprises one output current of the AC/DC conversion module; and the charging control module is further configured to:

determine a desired charging power based on the charging voltage and/or the charging current of the battery;

determine a desired current based on at least two output currents corresponding to the at least two receiving branches; and determine a desired voltage based on the desired charging power and the desired current, take the desired voltage as the feedback information and provide the feedback information to the wireless charging device, enabling the wireless charging device to adjust the transmitting power of the electromagnetic signal based on the feedback information.

6. The to-be-charged device according to claim 5, wherein the voltage of each receiving branch comprises the output voltage of the AC/DC conversion module; and the charging control module is further configured to:

compare the desired voltage and the output voltage to obtain a voltage difference; and take the voltage difference as the feedback information and provide the feedback information to the wireless charging device, enabling the wireless charging device to adjust the transmitting power of the electromagnetic signal based on the feedback information.

7. The to-be-charged device according to claim 3, wherein the voltage conversion circuit in the at least one of the at least two receiving branches is a buck circuit, a boost-buck circuit, or a charging integrated circuit; or the voltage conversion circuit in each of the at least two receiving branches is a charge pump circuit.

8. The to-be-charged device according to claim 7, wherein the voltage conversion circuit in a remaining receiving branch of the at least two receiving branches is the charge pump circuit; and the remaining receiving branch is any receiving branch of the at least two receiving branches other than the at least one receiving branch.

9. The to-be-charged device according to claim 3, wherein the at least two receiving branches comprise a first receiving branch and a second receiving branch, the voltage conversion circuit in the first receiving branch is a buck circuit, a boost-buck circuit or a charging integrated circuit, and the voltage conversion circuit in the second receiving branch is a charge pump circuit; and the charging control module is configured to control the first receiving branch and the second receiving branch to operate simultaneously in response to the battery being in a constant-current charging phase, and control the first receiving branch to operate in response to the battery being in a non-constant-current charging phase.

10. The to-be-charged device according to claim 3, wherein the charging control module is further configured to:

control one of the at least two receiving branches to operate, and control a remaining receiving branch of the at least two receiving branches to not operate, in response to the wireless charging device being detected as comprising only one transmitting branch, wherein the voltage conversion circuit in the receiving branch that is controlled to operate is a buck circuit, a boost-buck circuit or a charging integrated circuit; or obtain a maximum transmitting power of the wireless charging device, control one of the at least two receiving branches to operate, and control the remaining receiving branch of the at least two receiving branches to not operate, in response to the obtained maximum transmitting power being less than a preset power threshold; wherein the voltage conversion circuit in the receiving branch that is controlled to operate is the buck circuit, the boost-buck circuit or the charging integrated circuit.

11. The to-be-charged device according to claim 3, wherein the AC/DC conversion module further comprises a switch controlling module; and the switch controlling module is configured to control the receiving branch in which the switch controlling module is configured to be disconnected in response to the current or the voltage transmitted in the receiving branch in which the switch controlling module is configured being greater than a preset abnormal threshold to stop charging.

12. The to-be-charged device according to claim 1, wherein the charging control module is further configured to:

determine a desired charging power based on the charging voltage and/or the charging current of the battery;

take the desired charging power as the feedback information and provide the feedback information to the wireless charging device, enabling the wireless charging device to adjust the transmitting power of the electromagnetic signal of each transmitting branch based on the feedback information.

13. The to-be-charged device according to claim 1, wherein the charging control module is further configured to send feedback information to the wireless charging device for increasing a transmitting voltage or decreasing the transmitting voltage.

14. The to-be-charged device according to claim 1, wherein the charging control module is further configured to establish handshake communication with the wireless charging device based on a predetermined wireless communication protocol to transmit the feedback information.

15. The to-be-charged device according to claim 1, wherein the at least two receiving branches comprise a first receiving branch and a second receiving branch, the first receiving branch comprises a first AC/DC conversion circuit and a first voltage conversion circuit, and the second receiving branch comprises a second AC/DC conversion circuit and a second voltage conversion circuit;
the first voltage conversion circuit is connected to the first AC/DC conversion circuit and the second AC/DC conversion circuit;
the second voltage conversion circuit is connected to the first AC/DC conversion circuit and/or the second AC/DC conversion circuit;
the charging control module is further configured to control the first voltage conversion circuit to operate in a constant-current charging phase and control the second voltage conversion circuit to operate in a trickle charging phase and/or a constant-voltage charging phase.

16. The to-be-charged device according to claim 15, wherein the first voltage conversion circuit is a charge pump circuit, and the second voltage conversion circuit is a buck circuit, a boost-buck circuit, or a charging integrated circuit.

17. The to-be-charged device according to claim 1, wherein the charging control module is configured to:
detect a charging state of the to-be-charged device; and
send a stop-charging command to the wireless charging device in response to the charging state conforming to an abnormal charging state, wherein the stop-charging command is configured to instruct the wireless charging device to stop transmitting the electromagnetic signal to stop the wireless charging device from providing the transmitting power to the to-be-charged device,
wherein the abnormal charging state comprises: remaining power of the battery being greater than a preset power value, and/or a battery temperature being greater than a preset temperature, and/or the charging voltage of the battery being greater than a preset voltage, and/or, the charging current of the battery being greater than a preset current.

18. A wireless charging device, comprising: a transmit control module and at least two transmitting branches, wherein each transmitting branch of the at least two transmitting branches is electrically connected to a power supply, each transmitting branch of the at least two transmitting branches is connected to the transmit control module, the transmit control module is electrically connected to the power supply;
the transmit control module is configured to control an input current and an input voltage provided by the power supply to the at least two transmitting branches;
each transmitting branch is configured to generate one path of electromagnetic signal based on the input current and the input voltage and transmit the electromagnetic signal to one receiving branch of the to-be-charged device according to claim 1; and the transmit control module is further configured to receive feedback information sent by the to-be-charged device and adjust a transmitting power of the electromagnetic signal of each transmitting branch based on the feedback information.

19. A charging system, comprising a wireless charging device and a to-be-charged device,
wherein the wireless charging device comprises a transmit control module and at least two transmitting branches, the to-be-charged device comprises at least two receiving branches, a charging control module and a battery; each transmitting branch of the at least two transmitting branches is electrically connected to a power supply, each transmitting branch of the at least two transmitting branches is electrically connected to the transmit control module; the transmit control module is electrically connected to the power supply; each receiving branch of the at least two receiving branches is electrically connected to the charging control module and the battery; and
each receiving branch is electrically coupled to one of the at least two transmitting branches by electromagnetic coupling;
the transmit control module is configured to control an input current and an input voltage provided by the power supply to the at least two transmitting branches;
each transmitting branch is configured to generate one path of electromagnetic signal based on the input current and the input voltage and transmit the electromagnetic signal to one correspondingly coupled receiving branch of the at least two receiving branches; and
each receiving branch is configured to couple to receive the electromagnetic signal transmitted by the coupled transmitting branch and configured to convert the received electromagnetic signal into a charging voltage and a charging current for charging the battery of the to-be-charged device;
the charging control module is configured to generate feedback information based on at least one of following charging parameters and provide the feedback information to the wireless charging device, wherein the charging parameters comprise: a charging voltage of the battery, a charging current of the battery, a voltage of each receiving branch and a current of each receiving branch; and
the transmit control module is further configured to receive the feedback information sent by the to-be-charged device and adjust a transmitting power of the electromagnetic signal of each transmitting branch based on the feedback information;
the charging control module is further configured to control at least one of the at least two receiving branches to operate based on a charging phase of the battery to charge the battery; the charging phase comprises: a constant-current charging phase and a constant-voltage charging phase;
the charging control module is further configured to:
control the at least two receiving branches to operate simultaneously in response to the battery being in a constant-current charging phase; and
control at least one of the at least two receiving branches to operate when the battery is in a non-constant-current charging phase.

* * * * *